(12) United States Patent
Hirose et al.

(10) Patent No.: US 8,197,969 B2
(45) Date of Patent: Jun. 12, 2012

(54) ANODE AND BATTERY

(75) Inventors: Takakazu Hirose, Fukushima (JP);
Kenichi Kawase, Fukushima (JP);
Isamu Konishiike, Fukushima (JP);
Shunsuke Kurasawa, Fukushima (JP);
Masayuki Iwama, Fukushima (JP);
Koichi Matsumoto, Fukushima (JP)

(73) Assignee: Sony Corporation, Tokyo (JP)

( * ) Notice: Subject to any disclaimer, the term of this patent is extended or adjusted under 35 U.S.C. 154(b) by 1043 days.

(21) Appl. No.: 12/132,950

(22) Filed: Jun. 4, 2008

(65) Prior Publication Data
US 2008/0305391 A1 Dec. 11, 2008

(30) Foreign Application Priority Data

Jun. 5, 2007 (JP) .................................. 2007-149251

(51) Int. Cl.
*H01M 4/13* (2010.01)
(52) U.S. Cl. .................. 429/231.95; 429/302; 429/322; 429/252

(58) Field of Classification Search .................. 429/302, 429/322, 231.95, 252
See application file for complete search history.

(56) References Cited

U.S. PATENT DOCUMENTS

| | | | |
|---|---|---|---|
| 2004/0072072 A1* | 4/2004 | Suzuki et al. | 429/231.1 |
| 2004/0214085 A1* | 10/2004 | Sheem et al. | 429/218.1 |
| 2005/0233207 A1* | 10/2005 | Kim | 429/122 |
| 2006/0127773 A1* | 6/2006 | Kawakami et al. | 429/245 |
| 2006/0154149 A1* | 7/2006 | Arai et al. | 429/332 |
| 2007/0141470 A1* | 6/2007 | Nakura | 429/231.3 |

* cited by examiner

*Primary Examiner* — Patrick Ryan
*Assistant Examiner* — Ben Lewis
(74) *Attorney, Agent, or Firm* — SNR Denton US LLP

(57) ABSTRACT

A battery capable of improving cycle characteristics and a manufacturing yield is provided. An anode includes: an anode current collector; and an anode active material layer arranged on the anode current collector, in which the anode active material layer includes an anode active material including a plurality of pores, and the rate of change in the amount of mercury intruded into the plurality of pores is distributed so as to have a peak in a diameter range from 80 nm to 1200 nm both inclusive, the amount of mercury intruded being measured by mercury porosimetry.

36 Claims, 14 Drawing Sheets

NUMBER OF LAYERS OF ANODE ACTIVE MATERIAL:6 LAYERS

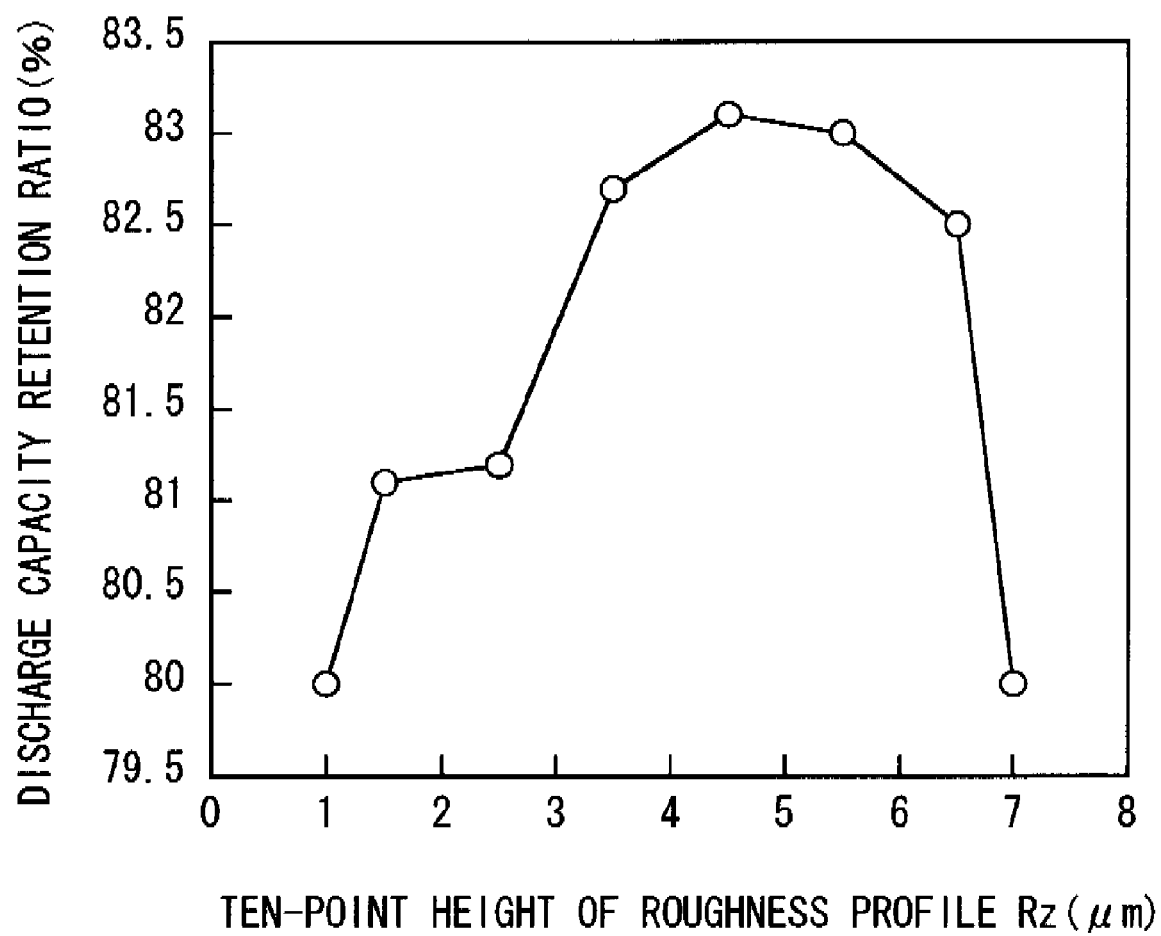
F I G. 14

ANODE AND BATTERY

CROSS REFERENCES TO RELATED APPLICATIONS

The present invention contains subject matter related to Japanese Patent Application JP 2007-149251 filed in the Japanese Patent Office on Jun. 5, 2007, the entire contents of which being incorporated herein by reference.

BACKGROUND OF THE INVENTION

1. Field of the Invention

The present invention relates to an anode including an anode current collector and an anode active material layer arranged on the anode current collector, and a battery including the anode.

2. Description of the Related Art

In recent years, portable electronic devices such as camera-integrated VTRs (videotape recorders), cellular phones, or laptop computers are widely used, and size and weight reduction in the portable electronic devices and an increase in longevity of the portable electronic devices have been strongly demanded. Accordingly, as power sources for the portable electronic devices, the development of batteries, specifically lightweight secondary batteries capable of obtaining a high energy density have been promoted. Among them, a secondary battery (a so-called lithium-ion secondary battery) using insertion and extraction of lithium for charge-discharge reaction holds great promise, because the secondary battery is capable of obtaining a larger energy density, compared to a lead-acid battery or a nickel-cadmium battery.

The lithium-ion secondary battery includes a cathode, an anode and an electrolytic solution, and the anode has a configuration in which an anode active material layer including an anode active material is arranged on an anode current collector. As the anode active material, a carbon material is widely used; however, recently with enhancement of performance and expansion of functions in portable electronic devices, a further improvement in battery capacity is desired, so it is considered to use silicon instead of a carbon material. It is because the theoretical capacity of silicon (4199 mAh/g) is much larger than the theoretical capacity of graphite (372 mAh/g), so a remarkable improvement in battery capacity is expected.

However, when silicon is deposited as the anode active material by a vapor-phase method, a large number of pores are formed in the anode active material to cause an increase in the surface area of the anode active material. In this case, silicon has high activity, and is prone to swelling during charge and discharge, so the surface area of the anode active material has a large influence on the performance and manufacturing yield of the secondary battery. More specifically, when the surface area of the anode active material is too large, an electrolytic solution is decomposed during charge and discharge, and lithium is inactivated, so when charge and discharge are repeated, the discharge capacity of the secondary battery declines. Thereby, cycle characteristics which are important characteristics of the secondary battery decline. On the other hand, when the surface area of the anode active material is too small, a space (a spatial margin) for the anode active material during swelling is not sufficient, so the influence of a stress due to the swelling causes creases in an anode current collector. Thereby, the whole anode is deformed to cause a short circuit, thereby the manufacturing yield of the secondary battery declines.

Therefore, also in the case where silicon is used as the anode active material, to improve the cycle characteristics and the manufacturing yield, various ideas have been made.

More specifically, a technique in which in the case where the deposition of a silicon thin film is performed a plurality of times by a vapor-phase method, ions are applied to a surface of the silicon thin film before the second or later deposition steps (for example, refer to Japanese Unexamined Patent Application Publication No. 2005-293899), a technique in which an anode current collector having a three-dimensional configuration such as foam metal or a sintered fiber metal body is used (for example, refer to Japanese Unexamined Patent Application Publication No. 2004-071305), or a technique in which silicon is sintered to be integrated with an anode current collector (for example, refer to Japanese Unexamined Patent Application Publication Nos. H11-339777 and H11-339778) or the like has been proposed.

Moreover, a technique in which silicon particles are coated with a fired body (ceramic) such as a metal oxide (for example, refer to Japanese Unexamined Patent Application Publication Nos. 2004-335334 and 2004-335335), a technique in which an oxide layer such as silicon oxide is formed on a surface of a silicon alloy layer (for example, refer to Japanese Unexamined Patent Application Publication No. 2004-319469), a technique in which a conductive metal is reductively deposited on silicon powder (for example, refer to Japanese Unexamined Patent Application Publication No. H11-297311), a technique in which silicon compound particles are coated with a metal (for example, refer to Japanese Unexamined Patent Application Publication No. 2000-036323), a technique in which a metal element not alloyed with lithium is dispersed in silicon particles (for example, refer to Japanese Unexamined Patent Application Publication No. 2001-273892), a technique in which copper is dissolved into a silicon thin film (for example, refer to Japanese Unexamined Patent Application Publication No. 2002-289177) or the like has been proposed.

SUMMARY OF THE INVENTION

As recent portable electronic devices have a smaller size, higher performance and more functions, secondary batteries are frequently charged and discharged accordingly, thereby cycle characteristics easily decline. Moreover, in the case where silicon is used as an anode active material to increase the capacity of a secondary battery, the anode active material is easily swelled during charge and discharge, so the manufacturing yield of the secondary battery easily declines. Therefore, further improvement in the cycle characteristics and the manufacturing yield is desired.

In view of the foregoing, it is desirable to provide an anode and a battery which are capable of improving cycle characteristics and a manufacturing yield.

According to an embodiment of the invention, there is provided an anode including: an anode current collector; and an anode active material layer arranged on the anode current collector, in which the anode active material layer includes an anode active material including a plurality of pores, and the rate of change in the amount of mercury intruded into the plurality of pores is distributed so as to have a peak in a diameter range from 80 nm to 1200 nm both inclusive, the amount of mercury intruded being measured by mercury porosimetry.

According to an embodiment of the invention, there is provided a battery including a cathode, an anode and an electrolytic solution, in which the anode includes an anode current collector and an anode active material layer arranged on the anode current collector, the anode active material layer includes an anode active material including a plurality of pores, and the rate of change in the amount of mercury intruded into the plurality of pores is distributed so as to have a peak in a diameter range from 80 nm to 1200 nm both inclusive, the amount of mercury intruded being measured by mercury porosimetry.

The above-described "amount of mercury intruded being measured by mercury porosimetry" is the amount of mercury intruded into a plurality of pores which is measured by a mercury porosimeter, and a value measured under conditions that the surface tension and the contact angle of mercury are 485 mN/m and 130°, respectively, and a relationship between the diameter of a pore and pressure is approximate to 180/pressure=diameter. Accordingly, "the rate of change in the amount of mercury intruded is distributed so as to have a peak in a diameter range from 80 nm to 1200 nm both inclusive" means that in the measurement result of the mercury porosimeter (the horizontal axis: diameter, the vertical axis: the rate of change in the amount of mercury intruded), the rate of change in the amount of mercury intruded is distributed so as to draw an upward convex curve in a diameter range from 80 nm to 1200 nm both inclusive.

In the anode according to the embodiment of the invention, the anode active material includes a plurality of pores, and the rate of change in the amount of mercury intruded into the plurality of pores which is measured by mercury porosimetry is distributed so as to have a peak in a diameter range from 80 nm to 1200 nm both inclusive, so compared to the case where the rate of change is not distributed so as to have a peak in the diameter range, even in the case where the anode active material has high activity, the anode active material is resistant to reacting with another material, and even in the case where the anode active material is easily swelled during electrode reaction, the anode is resistant to deformation. Thereby, in a battery including the anode according to the embodiment of the invention, the cycle characteristics and the manufacturing yield may be improved. In this case, when the peak is included in a diameter range form 100 nm to 1000 nm both inclusive, more specifically in a diameter range from 120 nm to 600 nm both inclusive, a higher effect may be obtained.

Moreover, when the anode active material includes oxygen, and the oxygen content in the anode active material is within a range from 3 at % to 40 at % both inclusive, or when the anode active material includes at least one kind of metal element selected from the group consisting of iron, cobalt, nickel, titanium, chromium and molybdenum, or when the anode active material includes an oxygen-containing region (a region in which oxygen is included and the oxygen content is higher than that in a region other than the region) in its thickness direction, a higher effect may be obtained.

Further, when the ten-point height of roughness profile Rz of the surface of the anode current collector is within a range from 1.5 μm to 6.5 μm both inclusive, a higher effect may be obtained.

Other and further objects, features and advantages of the invention will appear more fully from the following description.

BRIEF DESCRIPTION OF THE DRAWINGS

FIG. 14 is a diagram showing a correlation between a ten-point height of roughness profile and a discharge capacity retention ratio.

DETAILED DESCRIPTION OF THE PREFERRED EMBODIMENTS

A preferred embodiment will be described in detail below referring to the accompanying drawings.

Figure 1:
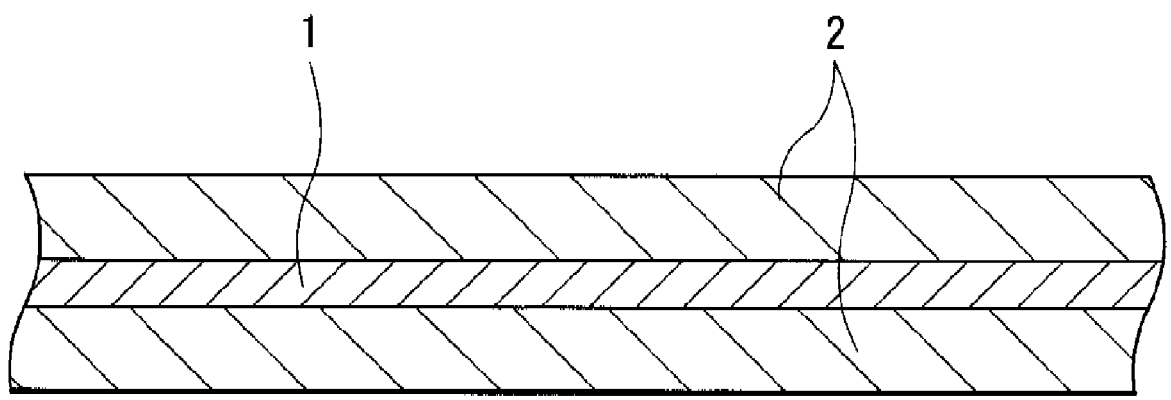
FIG. 1 is a sectional view showing the configuration of an anode according to an embodiment of the invention.

FIG. 1 shows a sectional view of an anode according to an embodiment of the invention. The anode is used in, for example, an electrochemical device such as a battery, and includes an anode current collector 1 having a pair of facing surfaces, and an anode active material layer 2 arranged on the anode current collector 1.

The anode current collector 1 is preferably made of a metal material having good electrochemical stability, electrical conductivity and mechanical strength. Examples of the metal material include copper, nickel, stainless and the like. Among them, copper is preferable, because high electrical conductivity is obtained.

In particular, as the metal material of which the anode current collector 1 is made, a metal material including one kind or two or more kinds of metal elements which do not form an intermetallic compound with an electrode reactant is preferable. When the metal elements form an intermetallic compound with the electrode reactant, the influence of a stress due to swelling and shrinkage of the anode active material layer 2 during the operation of an electrochemical device (for example, during charge and discharge of a battery) may cause a decline in the current collecting property or peeling of the anode active material layer 2 from the anode current collector 1. Examples of the metal elements include copper, nickel, titanium, iron, chromium and the like.

Moreover, the above-described metal material preferably includes one kind or two or more kinds of metal elements which are alloyed with the anode active material layer 2. It is because adhesion between the anode current collector 1 and the anode active material layer 2 is improved, so the anode active material layer 2 is less prone to being peeled from the anode current collector 1. Examples of metal elements which do not form an intermetallic compound with the electrode reactant and are alloyed with the anode active material layer 2 include copper, nickel, iron and the like in the case where the anode active material layer 2 includes silicon as an anode active material. These metal elements are preferable in terms of strength and electrical conductivity.

The anode current collector 1 may have a single-layer configuration or a multilayer configuration. In the case where the anode current collector 1 has a multilayer configuration, for example, it is preferable that a layer adjacent to the anode active material layer 2 is made of a metal material which is alloyed with the anode active material layer 2, and a layer not adjacent to the anode active material layer 2 is made of any other metal material.

The surface of the anode current collector 1 is preferably roughened. It is because adhesion between the anode current collector 1 and the anode active material layer 2 is improved by a so-called anchor effect. In this case, at least a surface facing the anode active material layer 2 of the anode current collector 1 may be roughened. As a roughening method, for example, a method of forming fine particles by electrolytic treatment or the like is cited. The electrolytic treatment is a method of forming fine particles on the surface of the anode current collector 1 in an electrolytic bath by an electrolytic method to form a roughened surface. Copper foil subjected to the electrolytic treatment is generally called "electrolytic copper foil".

The ten-point height of roughness profile Rz of the surface of the anode current collector 1 is preferably within a range from 1.5 µm to 6.5 µm both inclusive. It is because adhesion between the anode current collector 1 and the anode active material layer 2 is further improved. More specifically, when the ten-point height of roughness profile Rz is smaller than 1.5 µm, sufficient adhesion may not be obtained, and when the ten-point height of roughness profile Rz is larger than 6.5 µm, the anode active material may include a large number of holes to increase its surface area.

The anode active material layer 2 includes an anode active material capable of inserting and extracting an electrode reactant. The anode active material includes a plurality of pores, so the diameters of the plurality of pores are distributed over a wide range from approximately a few nm to a few thousands nm. The rate of change in the amount of mercury intruded into the plurality of pores which is measured by mercury porosimetry is distributed so as to have a peak in a diameter range from 80 nm to 1200 nm both inclusive. In this case, another peak may or may not be present in a diameter range smaller than 80 nm or larger than 1200 nm. The number of peaks in a diameter range from 80 nm to 1200 nm both inclusive may be one or plural (two or more). The same hold for the number of peaks in a diameter range smaller than 80 nm or larger than 1200 nm.

The reason why the rate of change in the amount of mercury intruded has a peak in the above-described diameter range is that the volumetric capacity of a pore with a wide diameter is relatively larger than the volumetric capacity of a pore with a narrow diameter, thereby the surface area of the anode active material becomes smaller, so even in the case where the anode active material has high activity, the anode active material is resistant to reacting with another material, and even in the case where the anode active material is easily swelled during electrode reaction, the anode is resistant to deformation. For example, in the case where the anode is used in a battery, another material is an electrolytic solution or the like, and electrode reaction means charge-discharge reaction or the like. The reason why the diameter range from 80 nm to 1200 nm both inclusive is used when defining a range in which the rate of change in the amount of mercury intruded has a peak is that as the volumetric capacities of pores with a diameter ranging from 80 nm to 1200 nm both inclusive do not largely contribute to the surface area of the anode active material, and the volumetric capacities of the pores are sufficient for a space (spatial margin) for the anode active material during swelling.

The above-described rate of change in the amount of mercury intruded is measurable by a mercury porosimeter, and is a value measured under conditions that the surface tension and the contact angle of mercury are 485 mN/m and 130°, respectively, and a relationship between the diameter of a pore and pressure is approximate to 180/pressure=diameter. From the measurement result of the mercury porosimeter, it may be determined whether or not the rate of change in the amount of mercury intruded has a peak in a diameter range from 80 nm to 1200 nm both inclusive.

In particular, the rate of change in the amount of mercury intruded preferably has a peak in a diameter range from 100 nm to 1000 nm both inclusive, more specifically in a diameter range from 120 nm to 600 nm both inclusive, because a higher effect is obtained.

In order for the rate of change in the amount of mercury intruded to have a peak in the above-described diameter range, the anode active material layer 2 may include an oxide-containing film or a metal not alloyed with an electrode reactant, if necessary. It is because when the oxide-containing film or the metal is intruded into pores, the distribution of the rate of change in the amount of mercury intruded is changed, so the distribution state is controllable so that a peak is present in a desired diameter range.

The oxide-containing film includes, for example, at least one kind of oxide selected from the group consisting of an oxide of silicon, an oxide of germanium and an oxide of tin. The oxide-containing film may include any other oxide except for them. The oxide-containing film may be formed by any one of a vapor-phase method and a liquid-phase method. Among them, the liquid-phase method such as a liquid-phase deposition method, a sol-gel method a coating method or a dip coating method is preferable, and among them, the liquid-phase deposition method is more preferable, because the oxide-containing film is easily intruded into the pores.

For example, the metal intruded into the pores includes at least one kind selected from the group consisting of iron, cobalt, nickel, zinc and copper. The metal may include any other metal element except for them. The form of the metal is not limited to the simple substance, and the metal may be an alloy or a metal compound. The metal may be formed by any one of a vapor-phase method or a liquid-phase method. Among them, the liquid-phase method such as an electrolytic plating method or an electroless plating method is preferable, and the electrolytic plating method is more preferable, because the metal is easily intruded into the pores, and only a short plating time is necessary. When the anode active material layer 2 includes the metal, the metal functions as a binder, so binding in the anode active material is improved.

The anode active material layer 2 may include only one or both of the oxide-containing film and the metal. In the case where only one of them is included, the oxide-containing film is preferably included. It is because the oxide-containing film formed by a liquid-phase method such as a liquid-phase deposition method is intruded into pores more easily than the metal formed by a liquid-phase method such as an electrolytic plating method.

The anode active material preferably includes silicon as an element. It is because silicon has a high capability of inserting and extracting an electrode reactant, so a high energy density is obtained. The anode active material may be any one of the simple substance, an alloy and a compound of silicon, or may include a phase including one kind or two or more kinds selected from them at least in part. Only one kind or a mixture of two or more kinds selected from them may be used.

In the present invention, the alloy means an alloy including two or more kinds of metal elements as well as an alloy including one or more kinds of metal elements and one or more kinds of metalloid elements. Moreover, the alloy may include a non-metal element. As the texture of the alloy, a solid solution, a eutectic (eutectic mixture), an intermetallic compound or the coexistence of two or more kinds selected from them is cited.

As an alloy of silicon, for example, an alloy including at least one kind selected from the group consisting of tin (Sn), nickel, copper, iron, cobalt, manganese (Mn), zinc, indium (In), silver (Ag), titanium, germanium (Ge), bismuth (Bi), antimony (Sb) and chromium as an element in addition to silicon is cited.

As a compound of silicon, for example, a compound including oxygen and carbon (C) as elements in addition to silicon, or the like is cited. The compound of silicon may include one kind or two or more kind of the elements described in the alloy of silicon as elements in addition to silicon.

The anode active material is attached to the anode current collector 1, and is grown from the surface of the anode current collector 1 in the thickness direction of the anode active material layer 2. In this case, the anode active material is formed by a vapor-phase method, and as described above, the anode current collector 1 and the anode active material layer 2 are preferably alloyed at least in a part of an interface therebetween. More specifically, the elements of the anode current collector 1 may be diffused into the anode active material in the interface, or the elements of the anode active material may be diffused into the anode current collector 1 in the interface, or they may be diffused into each other in the interface. It is because it is difficult to cause a fracture in the anode active material layer 2 due to swelling and shrinkage thereof during charge and discharge, and electron conductivity between the anode current collector 1 and the anode active material layer 2 is improved.

As the above-described vapor-phase method, for example, a physical deposition method or a chemical deposition method, more specifically, a vacuum deposition method, a sputtering method, an ion plating method, a laser ablation method, a thermal CVD (Chemical Vapor Deposition) method, a plasma chemical vapor deposition method or the like is cited.

Moreover, the anode active material may have the form of a plurality of particles. The anode active material may be formed by one deposition step to have a single-layer configuration, or may be formed by a plurality of deposition steps to have a multilayer configuration in particles. However, in the case where the anode active material is formed by an evaporation method accompanied by high heat during deposition, to prevent the anode current collector 1 from suffering heat damage, the anode active material preferably has a multilayer configuration. It is because when the step of depositing the anode active material is divided into several times to be performed (the anode active material is successively formed to be deposited), compared to the case where the deposition step is performed only once, the time that the anode current collector 1 is exposed to high heat is reduced.

In particular, the anode active material preferably includes oxygen as an element. It is because swelling and shrinkage of the anode active material layer 2 are prevented. In the anode active material layer 2, at least a part of oxygen is bonded to a part of silicon. In this case, bonding between oxygen and silicon may be in the state of silicon monoxide or silicon dioxide, or in any other metastable state.

The oxygen content in the anode active material is preferably within a range from 3 at % to 40 at % both inclusive, because a higher effect is obtained. More specifically, when the oxygen content is smaller than 3 at %, there is a possibility that swelling and shrinkage of the anode active material layer 2 are not sufficiently prevented, and when the oxygen content is larger than 40 at %, there is a possibility that resistance is increased too much. In the case where the anode is used with an electrolytic solution in an electrochemical device, a coating formed by the decomposition of the electrolytic solution is not included in the anode active material. In other words, in the case where the oxygen content in the anode active material is determined by calculation, oxygen in the above-described coating is not included.

For example, in the case where the anode active material is formed by a vapor-phase method, the anode active material including oxygen may be formed by continuously introducing an oxygen gas into a chamber. In particular, in the case where a desired oxygen content is not obtained only by introducing the oxygen gas, a liquid (for example, water vapor or the like) may be introduced into the chamber as a supply source of oxygen.

Moreover, the anode active material preferably includes at least one kind of metal element selected from the group consisting of iron, cobalt, nickel, titanium, chromium and molybdenum. It is because binding in the anode active material is improved, and swelling and shrinkage of the anode active material layer 2 are prevented, and the resistance of the anode active material is reduced. The content of the metal element in the anode active material is freely settable. However, in the case where the anode is used in a battery, when the content of the metal element is too large, to obtain a desired battery capacity, it is necessary to increase the thickness of the anode active material layer 2, so the anode active material layer 2 may be peeled from the anode current collector 1, or the anode active material layer 2 may be cracked.

The anode active material including the above-described metal element may be formed by using an evaporation source in which a metal element is mixed, or a multicomponent evaporation source when the anode active material is formed by an evaporation method as a vapor-phase method.

The anode active material includes an oxygen-containing region including oxygen in its thickness direction, and the oxygen content in the oxygen-containing region is preferably higher than the oxygen content in a region other than the oxygen-containing region. It is because swelling and shrinkage of the anode active material layer 2 are prevented. The region other than the oxygen-containing region may or may not include oxygen. In the case where the region other than the oxygen-containing region includes oxygen, the oxygen content in the region other than the oxygen-containing region is lower than that in the oxygen-containing region.

In this case, to prevent swelling and shrinkage of the anode active material layer 2, it is preferable that the region other than the oxygen-containing region includes oxygen, and the anode active material includes a first oxygen-containing region (a region having a lower oxygen content) and a second oxygen-containing region having a higher oxygen content than the first oxygen-containing region (a region having a higher oxygen content). In this case, the second oxygen-containing region is preferably sandwiched by the first oxygen-containing region, and more preferably, the first oxygen-containing region and the second oxygen-containing region are alternately laminated. It is because a higher effect is obtained. The oxygen content in the first oxygen-containing region is preferably as low as possible, and, for example, the oxygen content in the second oxygen-containing region is equal to the oxygen content in the case where the above-described material includes oxygen.

The anode active material including the first and second oxygen-containing regions may be formed by intermittently introducing an oxygen gas into a chamber, or changing the amount of the oxygen gas introduced into the chamber in the case where the anode active material is formed by, for example, a vapor-phase method. In the case where a desired oxygen content is not obtained only by introducing the oxygen gas, a liquid (for example, a water vapor or the like) may be introduced into the chamber.

The oxygen contents in the first and second oxygen-containing regions may or may not be distinctly different from each other. In particular, in the case where the amount of the above-described oxygen gas introduced is continuously changed, the oxygen content may be also continuously changed. In the case where the amount of the oxygen gas introduced is intermittently changed, the first and second oxygen-containing regions become so-called "layers", and in the case where the amount of the oxygen gas introduced is continuously changed, the first and second oxygen-containing regions become "laminar" rather than "layers". In the latter case, the oxygen content in the anode active material is distributed while the oxygen content changed up and down repeatedly. In this case, the oxygen content is preferably changed step by step or continuously between the first and second oxygen-containing regions. When the oxygen content is rapidly changed, ion diffusion may decline or resistance may be increased.

Figure 2A:
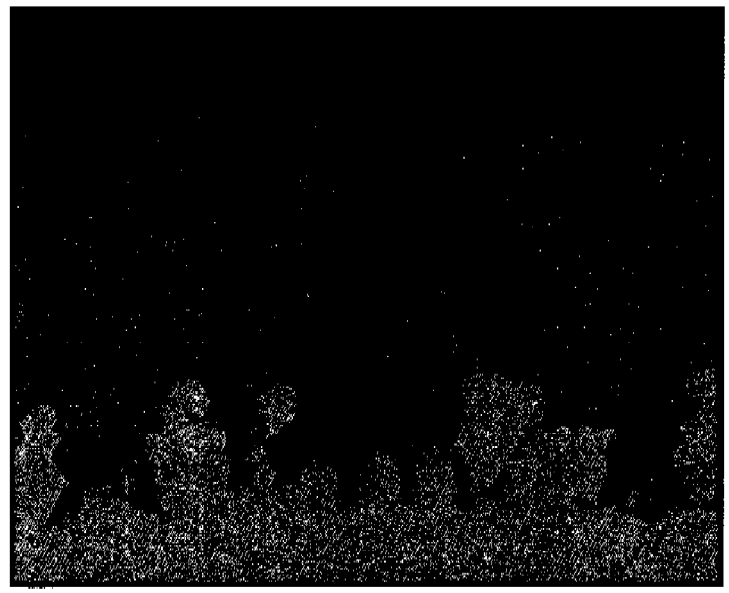
FIGS. 2A and 2B are an SEM photograph and a schematic view showing a sectional configuration of the anode shown in FIG. 1.
Figure 2B:
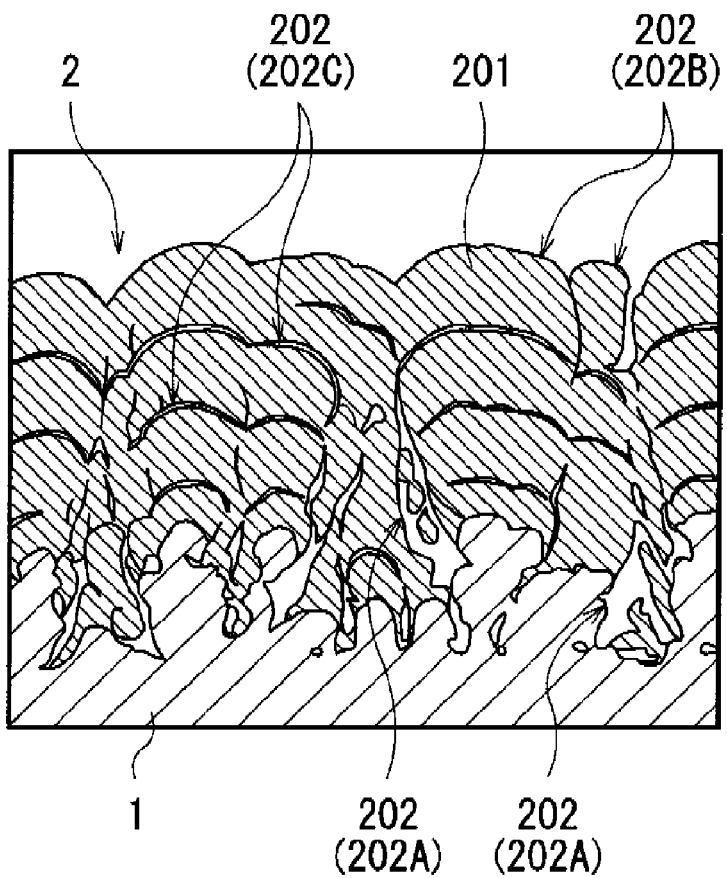
Figure 3:
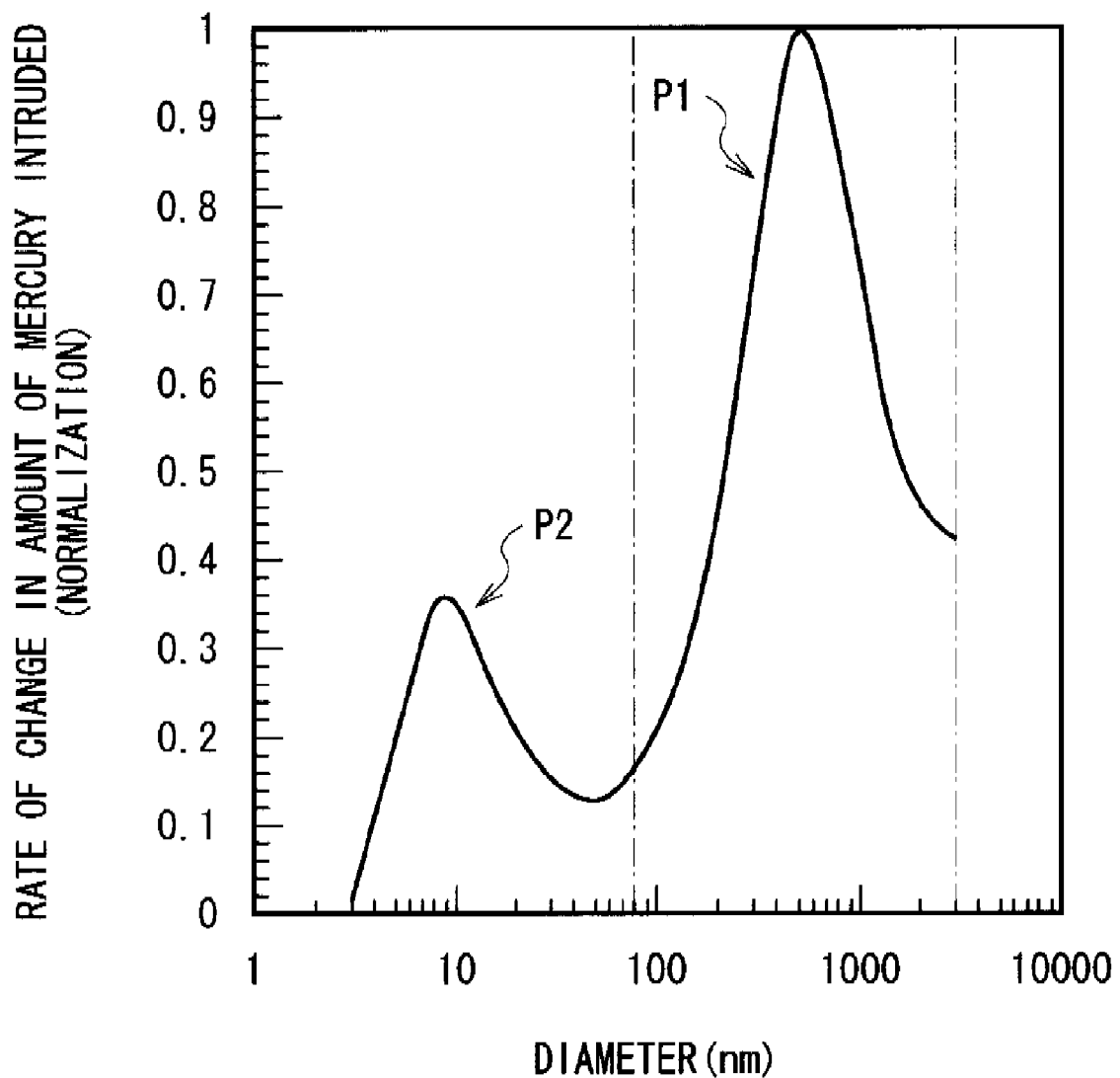
FIG. 3 is a chart showing the distribution of the rate of change in the amount of mercury intruded.

Referring to FIGS. 2A, 2B and 3, a specific configuration example of the anode in the case where a particulate anode active material has a multilayer configuration in its particles will be described below. FIGS. 2A and 2B show enlarged sectional views of the anode, and FIG. 2A shows a scanning electron microscope (SEM) photograph (a secondary electron image), and FIG. 2B shows a schematic view of the SEM image shown in FIG. 2A. FIG. 3 shows a distribution of the rate of change in the amount of mercury intruded, and the horizontal axis indicates a diameter (nm) and the vertical axis indicates the rate of change in the amount of mercury intruded.

As shown in FIGS. 2A and 2B, in the case where the anode active material includes a plurality of particles (anode active material particles 201), the anode active material includes a plurality of pores 202. More specifically, on the roughened surface of the anode current collector 1, a plurality of projections (for example, fine particles formed by electrolytic treatment) are present. In this case, the anode active material is deposited and laminated on the surface of the anode current collector 1 a plurality of times by a vapor-phase method or the like so as to grow the anode active material particles 201 step by step in a thickness direction on each of the above-described projections. Because of the closely packed configuration of the plurality of anode active material particles 201, the multilayer configuration and the surface configuration, a plurality of pores 202 are formed.

The pores 202 include three kinds, that is, pores 202A, 202B and 202C classified by causes of formation. The pores 202A are gaps formed between the anode active material particles 201 growing on each projection which is present on the surface of the anode current collector 1. The pores 202B are gaps formed between small stubble-shaped projections (not shown) which are formed on the surfaces of the anode active material particles 201. The pores 202B may be formed on the whole exposed surfaces of the anode active material particles 201, or a part of the exposed surfaces of the anode active material particles 201. The anode active material particles 201 have a multilayer configuration, and the pores 202C are gaps formed between layers of the multilayer configuration. The above-described small stubble-shaped projections are formed on the surfaces of the anode active material particles 201 in each formation of the anode active material particles 201, so the pores 202B are formed not only on the exposed surfaces (the outer surfaces) of the anode active material particles 201 but also between layers. The pores 202 may include any other pores formed because of any other cause of formation except for the above-described causes of formation.

When the amount V of mercury intruded into a plurality of pores is measured while increasing a pressure P by a mercury porosimeter in stages, as shown in FIG. 3, the rate of change ($\Delta V/\Delta P$) in the amount of mercury intruded is distributed so as to have a peak in a diameter range from 80 nm to 1200 nm both inclusive in a measurable diameter range from approximately 3 nm to approximately 3000 nm both inclusive. More specifically, the rate of change in the amount of mercury intruded has a peak P1 on a wide diameter side (a diameter range from 80 nm to 1200 nm both inclusive), and a peak P2 on a narrow diameter side (a diameter range from 3 nm to 50 nm both inclusive). The peak P1 on a wide diameter side is formed mainly due to the presence of the pores 202A, and the peak P2 on a narrow diameter side is formed mainly due to the presence of the pores 202B and 202C. In this case, for example, the case where the diameter at which the peak P1 is formed is 500 nm, and the diameter at which the peak P2 is formed is 9 nm is shown. The rate of change in the amount of mercury intruded on the vertical axis of FIG. 3 is a normalized value under the condition that the rate of change at the peak P1 is 1. In this case, as shown in FIG. 3, the case where the number of peaks in a diameter range from 80 nm to 1200 nm both inclusive is 1, and the number of peaks in a diameter range smaller than 80 nm is 1 is shown as an example.

In the case where the particulate anode active material has a multilayer configuration in its particles, as described above, the peak P2 is formed mainly because of the presence of the pores 202B and 202C. On the other hand, in the case where the particulate anode active material does not have a multilayer configuration in its particles (has a single-layer configuration), the peak P2 is formed mainly because of the presence of the pore 202B.

The anode is manufactured by the following steps, for example.

At first, after the anode current collector 1 is prepared, roughening treatment is subjected to the surface of the anode current collector 1 if necessary. Next, silicon is deposited on the anode current collector 1 by a vapor-phase method or the like to form the anode active material. In the case where the anode active material is formed, the anode active material may be formed by one deposition step to have a single-layer configuration, or the anode active material may be formed by a plurality of deposition steps to have a multilayer configuration. In the case where the anode active material is formed by a vapor-phase method to have a multilayer configuration, silicon may be deposited a plurality of times while the anode current collector 1 is moved back and forth relatively to an evaporation source, or silicon may be deposited a plurality of times while the anode current collector 1 is fixed relative to the evaporation source, and a shutter is repeatedly opened and closed. After that, an oxide-containing film or a metal not alloyed with an electrode reactant may be formed by a liquid-phase method or the like. Thereby, the anode active material layer 2 is formed, so the anode is completed.

In the case where the anode active material layer 2 is formed, for example, the diameter at which the rate of change in the amount of mercury intruded has a peak (the peak P1 shown in FIG. 3) is adjustable by the following method. In other words, when a various kinds of gases such as a carbon dioxide gas or an inert gas are introduced into a chamber, and the amounts of gases introduced are changed, the distribution of the rate of change in the amount of mercury intruded is changed. Moreover, in the case where the anode active material is formed by a vapor-phase method while the anode current collector 1 is moved relatively to an evaporation source, when the movement rate of the anode current collector 1 is changed, the distribution of the rate of change in the amount of mercury intruded is changed. The value of the diameter at which the peak is formed may be increased or decreased by any one of the methods.

In the anode, the anode active material includes a plurality of pores, and the rate of change in the amount of mercury intruded into a plurality of pores which is measured by mercury porosimetry is distributed so as to have a peak in a diameter range from 80 nm to 1200 nm both inclusive, so compared to the case where the rate of change is not distributed so as to have the peak in the diameter range, even in the case where the anode active material has high activity, the anode active material is resistant to reacting with another material, and even in the case where the anode active material is easily swelled during electrode reaction, the anode is resistant to deformation. Therefore, the anode may contribute to an improvement in the cycle characteristics and manufacturing yield of an electrochemical device using the anode. In this case, when the rate of change in the amount of mercury intruded has a peak in a diameter range from 100 nm to 1000 nm both inclusive, more specifically in a diameter range from 120 nm to 600 nm both inclusive, a higher effect may be obtained.

In particular, when the anode active material includes oxygen, and the oxygen content in the anode active material is within a range from 3 at % to 40 at % both inclusive, or when the anode active material includes at least one kind of metal element selected from the group consisting of iron, cobalt, nickel, titanium, chromium and molybdenum, or when the anode active material particles include an oxygen-containing region (a region including oxygen in which the oxygen content is higher than that in a region other than the region) in its thickness direction, a higher effect may be obtained.

Further, when the surface facing the anode active material layer 2 of the anode current collector 1 is roughened by fine particles formed by electrolytic treatment, adhesion between the anode current collector 1 and the anode active material layer 2 may be improved. In this case, when the ten-point height of roughness profile Rz of the surface of the anode current collector 1 is within a range from 1.5 μm to 6.5 μm both inclusive, a higher effect may be obtained.

Next, application examples of the above-described anode will be described below. As an example of the electrochemical device, a battery is used, and the anode is used in the battery as below.

(First Battery)

Figure 4:
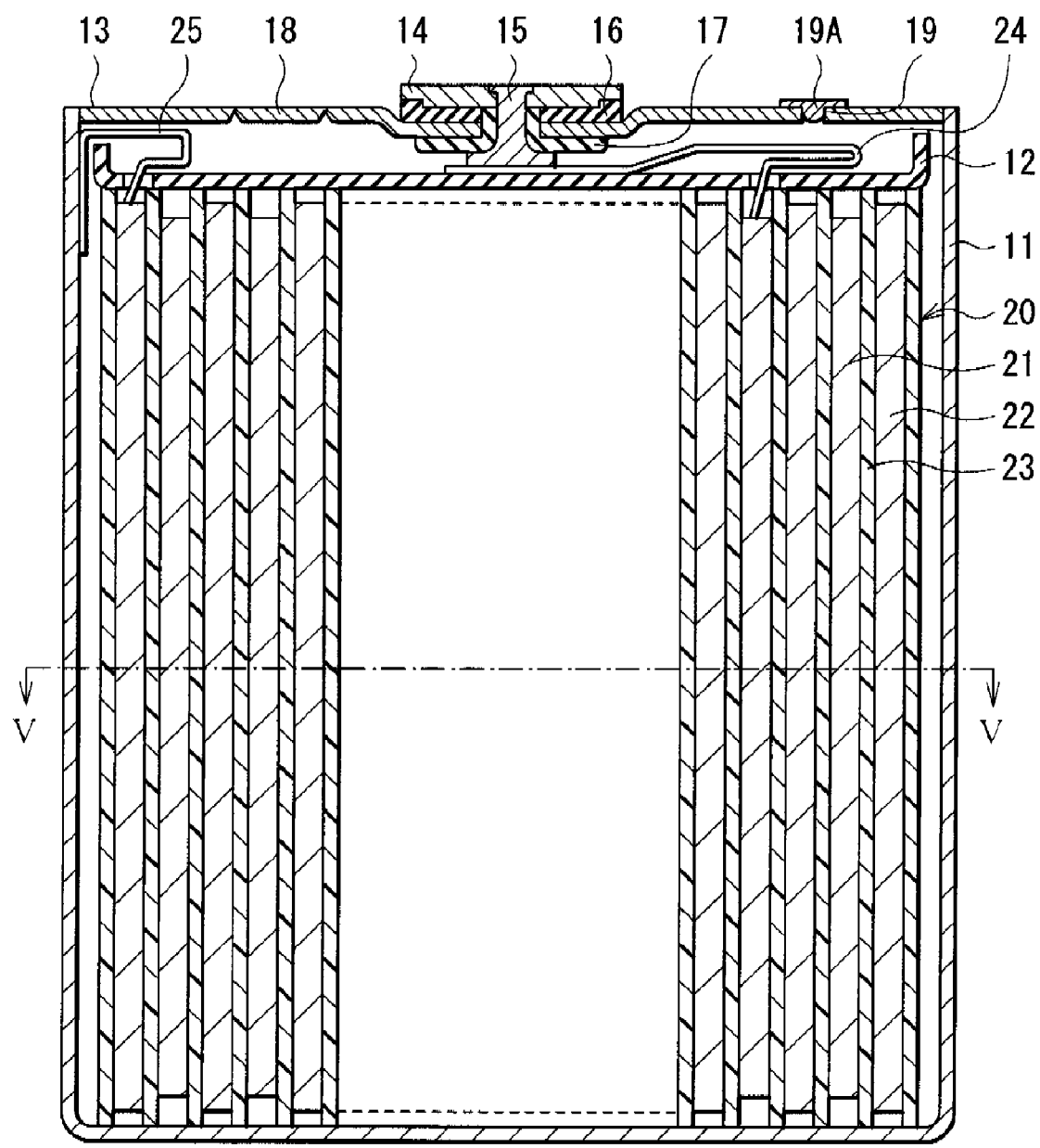
FIG. 4 is a sectional view showing the configuration of a first battery including the anode according to the embodiment of the invention.
Figure 5:
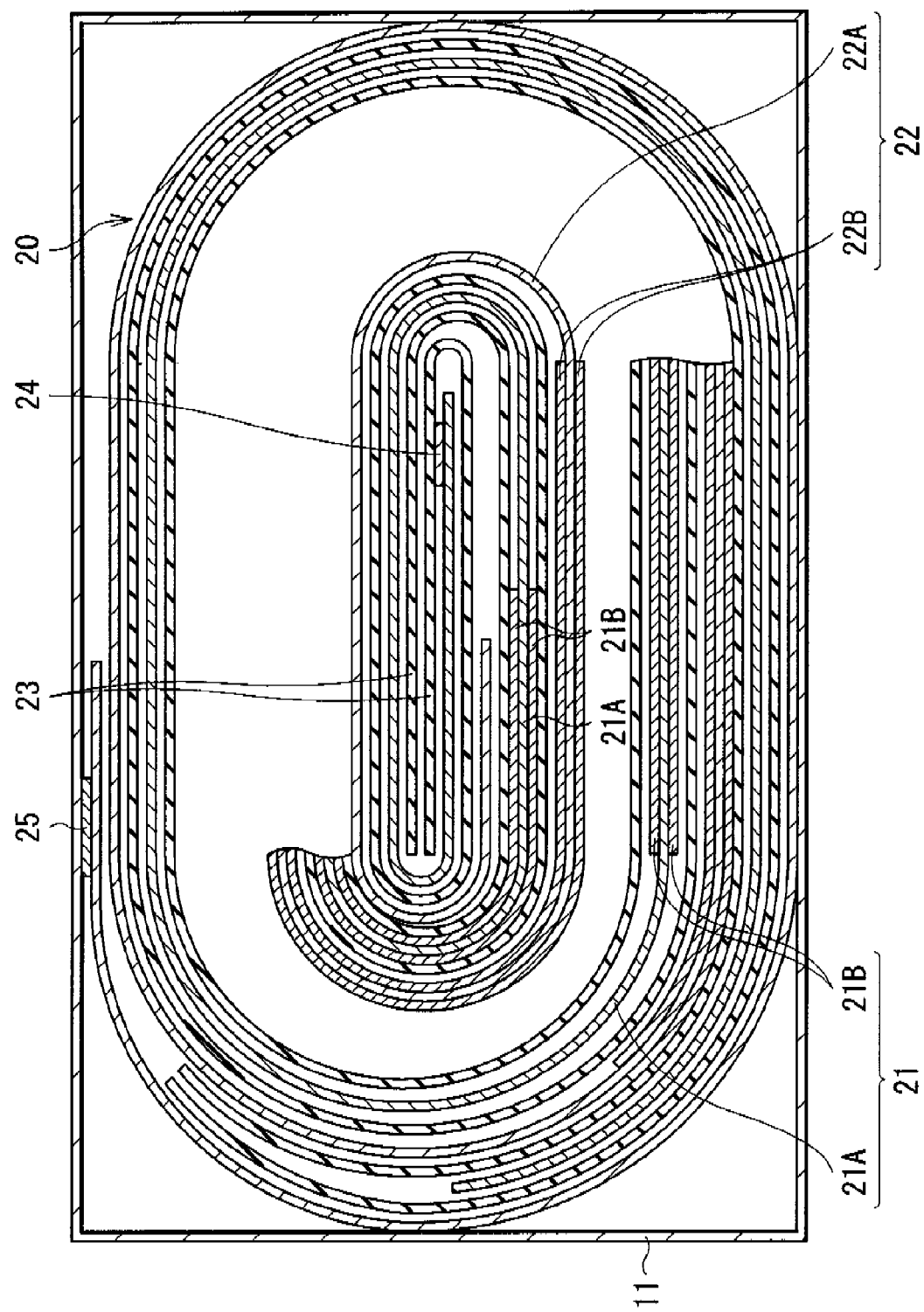
FIG. 5 is a sectional view of the first battery taken along a line V-V of FIG. 4.

FIGS. 4 and 5 show sectional views of a first battery, and FIG. 5 shows a sectional view taken along a line V-V of FIG. 4. The battery described here is, for example, a lithium-ion secondary battery in which the capacity of an anode 22 is represented based on insertion and extraction of lithium as an electrode reactant.

The secondary battery contains a battery element 20 having a flat winding configuration in a battery can 11.

The battery can 11 is, for example, a prismatic package member. As shown in FIG. 5, in the prismatic package member, a sectional surface in a longitudinal direction has a rectangular shape or a substantially rectangular shape (including a curve in part), and the prismatic package member forms not only a prismatic battery with a rectangular shape but also a prismatic battery with an oval shape. In other words, the prismatic package member is a vessel-shaped member having a rectangular closed end or a oval closed end and an opening with a rectangular shape or a substantially rectangular (an oval) shape formed by connecting arcs with straight lines. In FIG. 5, the battery can 11 having a rectangular sectional surface is shown. The battery configuration including the battery can 11 is a so-called prismatic type.

The battery can 11 is made of, for example, a metal material including iron or aluminum (Al), or an alloy thereof, and may have a function as an electrode terminal. In this case, to prevent swelling of the secondary battery through the use of the hardness (resistance to deformation) of the battery can 11 during charge and discharge, iron which is harder than aluminum is preferable. In the case where the battery can 11 is made of iron, for example, iron may be plated with nickel (Ni) or the like.

Moreover, the battery can 11 has a hollow configuration having an open end and a closed end, and an insulating plate 12 and a battery cover 13 are attached to the open end, and the battery can 11 is sealed. The insulating plate 12 is arranged between the battery element 20 and the battery cover 13 in a direction perpendicular to a peripheral winding surface of the battery element 20, and the insulating plate 12 is made of, for example, polypropylene or the like. The battery cover 13 is made of, for example, the same material as that of the battery can 11, and may have a function as an electrode terminal in the same manner.

A terminal plate 14 which becomes a cathode terminal is arranged outside of the battery cover 13, and the terminal plate 14 is electrically insulated from the battery cover 13 by an insulating case 16. The insulating case 16 is made of, for example, polybutylene terephthalate or the like. Moreover, a through hole is arranged around the center of the battery cover 13, and a cathode pin 15 is inserted into the through hole so as to be electrically connected to the terminal plate 14 and to be electrically insulated from the battery cover 13 by a gasket 17. The gasket 17 is made of, for example, an insulating material, and its surface is coated with asphalt.

A cleavage valve 18 and an injection hole 19 are arranged around an edge of the battery cover 13. The cleavage valve 18 is electrically connected to the battery cover 13, and when an internal pressure in the secondary battery increases to a certain extent or higher due to an internal short circuit or external application of heat, the cleavage valve 18 is separated from the battery cover 13 to release the internal pressure. The injection hole 19 is filled with a sealing member 19A made of, for example, a stainless steel ball.

The battery element 20 is formed by laminating a cathode 21 and an anode 22 with a separator 23 in between, and spirally winding them, and has a flat shape according to the shape of the battery can 11. A cathode lead 24 made of aluminum or the like is attached to an end (for example, an inside end) of the cathode 21, and an anode lead 25 made of nickel or the like is attached to an end (for example, an outside end) of the anode 22. The cathode lead 24 is welded to an end of the cathode pin 15 to be electrically connected to the terminal plate 14, and the anode lead 25 is welded and electrically connected to the battery can 11.

The cathode 21 is formed by arranging a cathode active material layer 21B on both sides of a strip-shaped cathode current collector 21A. The cathode current collector 21A is made of, for example, a metal material such as aluminum, nickel or stainless. The cathode active material layer 21B includes a cathode active material, and may include a binder, an electrical conductor or the like, if necessary.

The cathode active material includes one kind or two or more kinds of cathode materials capable of inserting and extracting lithium as an electrode reactant. As the cathode material, for example, lithium cobalt oxide, lithium nickel oxide, a solid solution including lithium cobalt oxide and lithium nickel oxide ($Li(Ni_xCo_yMn_z)O_2$; the values of x, y and z are $0<x<1$, $0<y<1$ and $0<z<1$, and $x+y+z=1$), lithium complex oxide such as lithium manganese oxide ($LiMn_2O_4$) with a spinel structure or a solid solution thereof ($Li(Mn_{2-v}Ni_v)O_4$; the value of v is $v<2$) or the like is cited. Moreover, as the cathode material, for example, a phosphate compound with an olivine structure such as lithium iron phosphate ($LiFePO_4$) is also cited. It is because a high energy density is obtained. In addition to the above-described materials, the cathode material may be, for example, an oxide such as titanium oxide, vanadium oxide or manganese dioxide, a bisulfide such as iron bisulfide, titanium bisulfide or molybdenum sulfide, sulfur, or a conductive polymer such as polyaniline or polythiophene.

The anode 22 has the same configuration as that of the above-described anode, and is formed by arranging an anode active material layer 22B on both sides of a strip-shaped anode current collector 22A. The configurations of the anode current collector 22A and the anode active material layer 22B are the same as those of the anode current collector 1 and the anode active material layer 2 in the above-described anode, respectively. The charge capacity of the anode active material capable of inserting and extracting lithium is preferably larger than the charge capacity of the cathode 21.

The separator 23 isolates between the cathode 21 and the anode 22 so that ions of an electrode reactant pass therethrough while preventing a short circuit of a current due to contact between the cathode 21 and the anode 22. The separator 23 is made of, for example, a porous film of a synthetic resin such as polytetrafluoroethylene, polypropylene or polyethylene, a porous ceramic film or the like, and the separator 23 may have a configuration in which two or more kinds of the porous films are laminated.

The separator 23 is impregnated with an electrolytic solution as a liquid electrolyte. The electrolytic solution includes a solvent and an electrolyte salt dissolved in the solvent.

The solvent includes, for example, one kind or two or more kinds of nonaqueous solvents such as organic solvents. Examples of the nonaqueous solvents include carbonate-based solvents such as ethylene carbonate, propylene carbonate, butylene carbonate, dimethyl carbonate, diethyl carbonate, ethyl methyl carbonate and methyl propyl carbonate. It is because superior capacity characteristics, storage characteristics and cycle characteristics are obtained. Only one kind or a mixture of a plurality of kinds selected from them may be used. Among them, as the solvent, a mixture of a high-viscosity solvent such as ethylene carbonate or propylene carbonate and a low-viscosity solvent such as dimethyl carbonate, ethyl methyl carbonate or diethyl carbonate is preferable. It is because the dissociation property of the electrolyte salt and ion mobility are improved, so a higher effect is obtained.

Moreover, the solvent preferably includes a halogenated carbonate. It is because a stable coating is formed on a surface of the anode 22 to prevent decomposition of the electrolytic solution, thereby the cycle characteristics are improved. As the halogenated carbonate, a fluorinated carbonate is preferable, and difluoroethylene carbonate is more preferable, because a higher effect is obtained. As the difluoroethylene carbonate, for example, 4,5-difluoro-1,3-dioxolane-2-one or the like is cited.

Further, the solvent preferably includes a cyclic carbonate including an unsaturated bond, because the cycle characteristics are improved. Examples of the cyclic carbonate including an unsaturated bond include vinylene carbonate, vinyl ethylene carbonate and the like, and a mixture of them may be used.

Moreover, the solvent preferably includes a sultone. It is because the cycle characteristics are improved, and swelling of the secondary battery is prevented. Examples of the sultone include 1,3-propene sultone and the like.

In addition, the solvent preferably includes an acid anhydride, because the cycle characteristics are improved. Examples of the acid anhydride include succinic anhydride, glutaric anhydride, maleic anhydride, sulfobenzoic anhydride, sulfopropionic anhydride, sulfobutyric anhydride, ethanedisulfonic anhydride, propanedisulfonic anhydride, benzenedisulfonic anhydride and the like. Only one kind or mixture of a plurality of kinds selected from them may be used. Among them, sulfobenzoic anhydride or sulfopropionic anhydride is preferable. It is because a sufficient effect is obtained. The content of the acid anhydride in the solvent is preferably within a range from 0.5 wt % to 3 wt % both inclusive.

The electrolyte salt includes one kind or two or more kind of light metal salts such as lithium salt. Examples of the lithium salt include lithium hexafluorophosphate ($LiPF_6$), lithium perchlorate ($LiClO_4$), lithium hexafluoroarsenate ($LiAsF_6$) and the like. It is because superior capacity characteristics, storage characteristics and cycle characteristics are obtained. Only one kind or a mixture of a plurality of kinds selected from them may be used. Among them, as the electrolyte salt, lithium hexafluorophosphate is preferable, because internal resistance is reduced, so a higher effect is obtained.

In particular, the electrolyte salt preferably includes a compound including boron and fluorine, because cycle characteristics are improved, and swelling of the secondary battery is prevented. Examples of the compound including boron and fluorine include lithium tetrafluoroborate and the like.

The content of the electrolyte salt in the solvent is, for example, within a range from 0.3 mol/kg to 3.0 mol/kg both inclusive, because superior capacity characteristics are obtained.

The secondary battery is manufactured by the following steps, for example.

At first, the cathode 21 is formed. At first, after the cathode active material, a binder and an electrical conductor are mixed to form a cathode mixture, the cathode mixture is dispersed in an organic solvent to form a paste-form cathode mixture slurry. Next, the cathode mixture slurry is uniformly applied to both sides of the cathode current collector 21A through the use of a doctor blade, a bar coater or the like, and the cathode mixture slurry is dried. After that, the cathode mixture slurry is compression molded by a roller press or the like while applying heat, if necessary, thereby the cathode active material layer 21B is formed. In this case, compression molding may be repeated a plurality of times.

Moreover, the anode active material layer 22B is formed on both sides of the anode current collector 22A by the same steps as the above-described steps of forming the anode so as to form the anode 22.

Next, the battery element 20 is formed through the use of the cathode 21 and the anode 22. At first, the cathode lead 24 and the anode lead 25 are attached to the cathode current collector 21A and the anode current collector 22A, respectively by welding or the like. Then, the cathode 21 and the anode 22 are laminated with the separator 23 in between to form a laminate, and the laminate are spirally wound in a longitudinal direction. After that, the laminate is molded into a flat shape to form the battery element 20.

Finally, the secondary battery is assembled. At first, after the battery element 20 is contained in the battery can 11, the insulating plate 12 is arranged on the battery element 20. Next, after the cathode lead 24 and the anode lead 25 are connected to the cathode pin 15 and the battery can 11, respectively, by welding or the like, the battery cover 13 is fixed in an open end of the battery can 11 by laser welding or the like. Finally, the electrolytic solution is injected into the battery can 11 through the injection hole 19 so that the separator 23 is impregnated with the electrolytic solution, and then the injection hole 19 is filled with the sealing member 19A. Thereby, the secondary battery shown in FIGS. 4 and 5 is completed.

When the secondary battery is charged, for example, lithium ions are extracted from the cathode 21, and are inserted into the anode 22 through the electrolytic solution with which the separator 23 is impregnated. On the other hand, when the secondary battery is discharged, the lithium ions are extracted from the anode 22 and are inserted into the cathode 21 through the electrolytic solution with which the separator 23 is impregnated.

In the prismatic secondary battery, the anode 22 has the same configuration as that of the above-described anode, so even if charge and discharge are repeated, the discharge capacity does not easily decline, and a short circuit does not easily occur during charge and discharge. Therefore, the cycle characteristics and the manufacturing yield may be improved. In this case, in the case where the anode 22 includes silicon which is advantageous to increase a capacity, the cycle characteristics are improved, so a higher effect than that in the case where the anode includes another anode material such as a carbon material may be obtained.

In particular, in the case where the battery can 11 is made of a hard metal, compared to the case where the battery can 11 is made of a soft film, the anode 22 is less prone to damage due to swelling and shrinkage of the anode active material layer 22B. Therefore, the cycle characteristics may be further improved. In this case, when the battery can 11 is made of iron which is harder than aluminum, a higher effect may be obtained.

The effects of the secondary battery except for the above-described effects are the same as those of the above-described anode.

(Second Battery)

Figure 6:
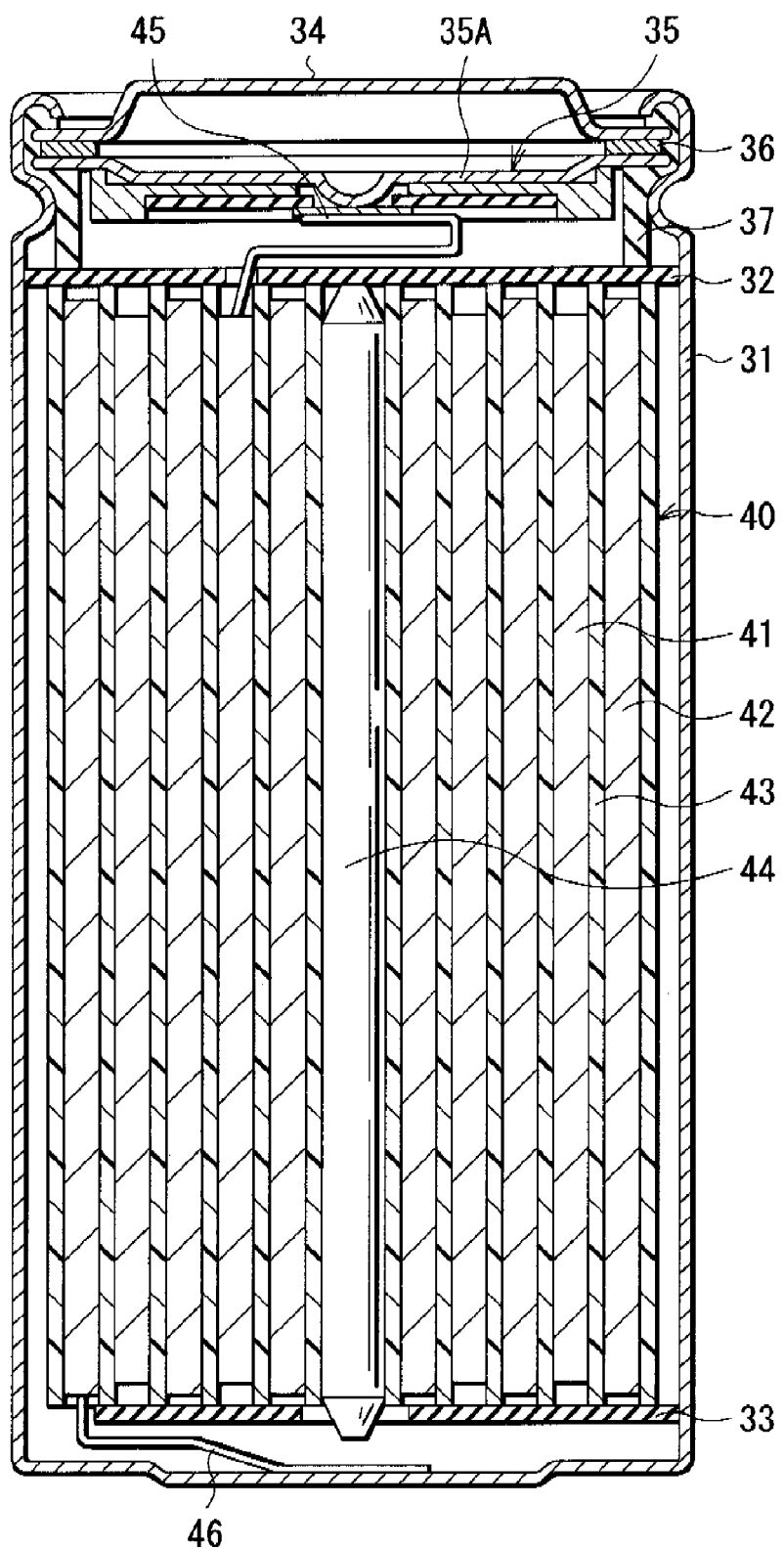
FIG. 6 is a sectional view showing the configuration of a second battery including the anode according to the embodiment of the invention.
Figure 7:
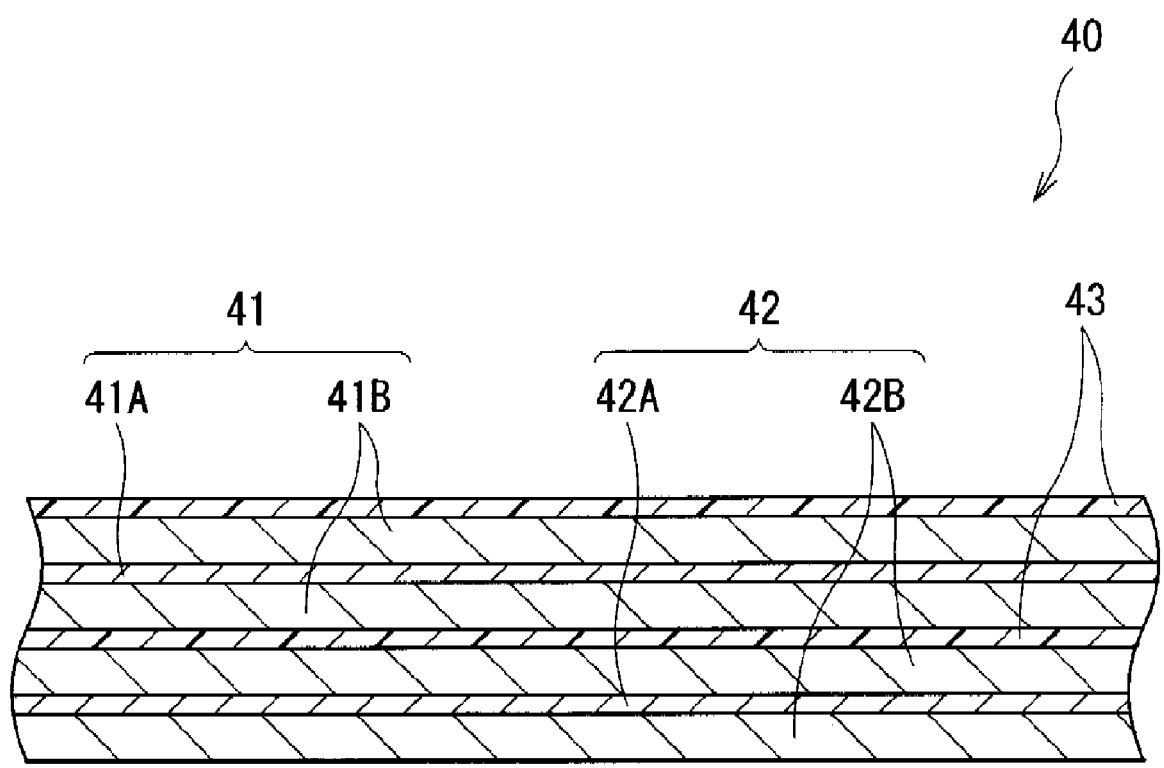
FIG. 7 is an enlarged sectional view showing a part of a spirally wound electrode body shown in FIG. 6.

FIGS. 6 and 7 show sectional views of a second battery, and FIG. 7 shows an enlarged view of a part of a spirally wound electrode body 40 shown in FIG. 6. The battery is a lithium-ion secondary battery as in the case of the first battery, and includes the spirally wound electrode body 40 which includes a cathode 41 and an anode 42 spirally wound with a separator 43 in between, and a pair of insulating plates 32 and 33 in a substantially hollow cylindrical-shaped battery can 31. The battery configuration including the battery can 31 is called a so-called cylindrical type.

The battery can 31 is made of, the same metal material as that of the battery can 11 in the first battery, and an end of the battery can 31 is closed, and the other end thereof is opened. The spirally wound electrode body 40 is sandwiched between the pair of insulating plates 32 and 33, and the pair of insulating plates 32 and 33 are arranged so as to extend in a direction perpendicular to a peripheral winding surface.

In the open end of the battery can 31, a battery cover 34, and a safety valve mechanism 35 and a positive temperature coefficient device (PTC device) 36 arranged inside the battery cover 34 are mounted by caulking by a gasket 37. Thereby, the interior of the battery can 31 is sealed. The battery cover 34 is made of, for example, the same material as that of the battery can 31. The safety valve mechanism 35 is electrically connected to the battery cover 34 through the PTC device 36. In the safety valve mechanism 35, when an internal pressure in the battery increases to a certain extent or higher due to an internal short circuit or external application of heat, a disk plate 35A is flipped so as to disconnect the electrical connection between the battery cover 34 and the spirally wound electrode body 40. When a temperature rises, the PTC device 36 limits a current by an increased resistance to prevent abnormal heat generation caused by a large current. The gasket 37 is made of, for example, an insulating material, and its surface is coated with asphalt.

For example, a center pin 44 may be inserted into the center of the spirally wound electrode body 40. In the spirally wound electrode body 40, a cathode lead 45 made of aluminum or the like is connected to the cathode 41, and an anode lead 46 made of nickel or the like is connected to the anode 42. The cathode lead 45 is welded to the safety valve mechanism 35 so as to be electrically connected to the battery cover 34, and the anode lead 46 is welded and electrically connected to the battery can 31.

The cathode 41 is formed by arranging a cathode active material layer 41B on both sides of a strip-shaped cathode current collector 41A. The anode 42 has the same configuration as that of the above-described anode, and is formed, for example, by arranging an anode active material layer 42B on both sides of a strip-shaped anode current collector 42A. The configurations of the cathode current collector 41A, the cathode active material layer 41B, the anode current collector 42A, the anode active material layer 42B and the separator 43, and the composition of the electrolytic solution are the same as the configurations of the cathode current collector 21A, the cathode active material layer 21B, the anode current collector 22A, the anode active material layer 22B and the separator 23, and the composition of the electrolytic solution in the first battery, respectively.

The secondary battery is manufactured by the following steps, for example.

At first, the cathode 41 in which the cathode active material layer 41B is arranged on both sides of the cathode current collector 41A, and the anode 42 in which the anode active material layer 42B is arranged on both sides of the anode current collector 42A are formed by the same steps as the above-described steps of forming the cathode 21 and the anode 22 in the first battery. Next, the cathode lead 45 is attached to the cathode 41, and the anode lead 46 is attached to the anode 42. Then, the cathode 41 and the anode 42 are spirally wound with the separator 43 in between to form the spirally wound electrode body 40, and an end of the cathode lead 45 is welded to the safety valve mechanism 35, and an end of the anode lead 46 is welded to the battery can 31, and then the spirally wound electrode body 40 sandwiched between the pair of insulating plates 32 and 33 is contained in the battery can 31. Next, the electrolytic solution is injected into the battery can 31 so that the separator 43 is impregnated with the electrolytic solution. Finally, the battery cover 34, the safety valve mechanism 35 and the PTC device 36 are fixed in an open end of the battery can 31 by caulking by the gasket 37. Thereby, the secondary battery shown in FIGS. 6 and 7 is completed.

When the secondary battery is charged, for example, lithium ions are extracted from the cathode 41, and are inserted into the anode 42 through the electrolytic solution. On the other hand, when the secondary battery is discharged, for example, the lithium ions are extracted from the anode 42 and are inserted into the cathode 41 through the electrolytic solution.

In the cylindrical secondary battery, the anode 42 has the same configuration as that of the above-described anode, so the cycle characteristics and the manufacturing yield may be improved. The effects of the secondary battery except for the above-described effects are the same as those of the first battery.

(Third Battery)

Figure 8:
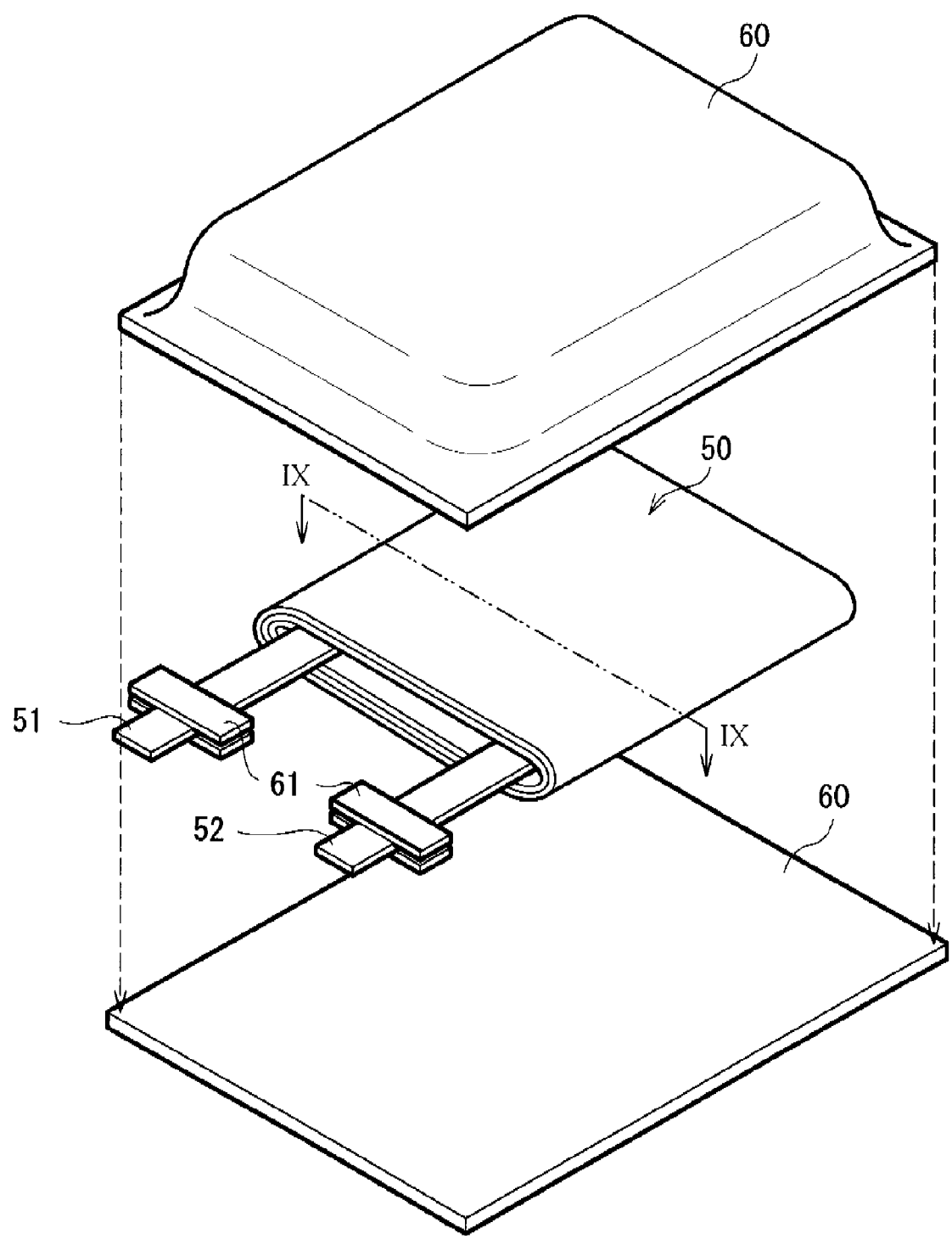
FIG. 8 is a sectional view showing the configuration of a third battery including the anode according to the embodiment of the invention.
Figure 9:
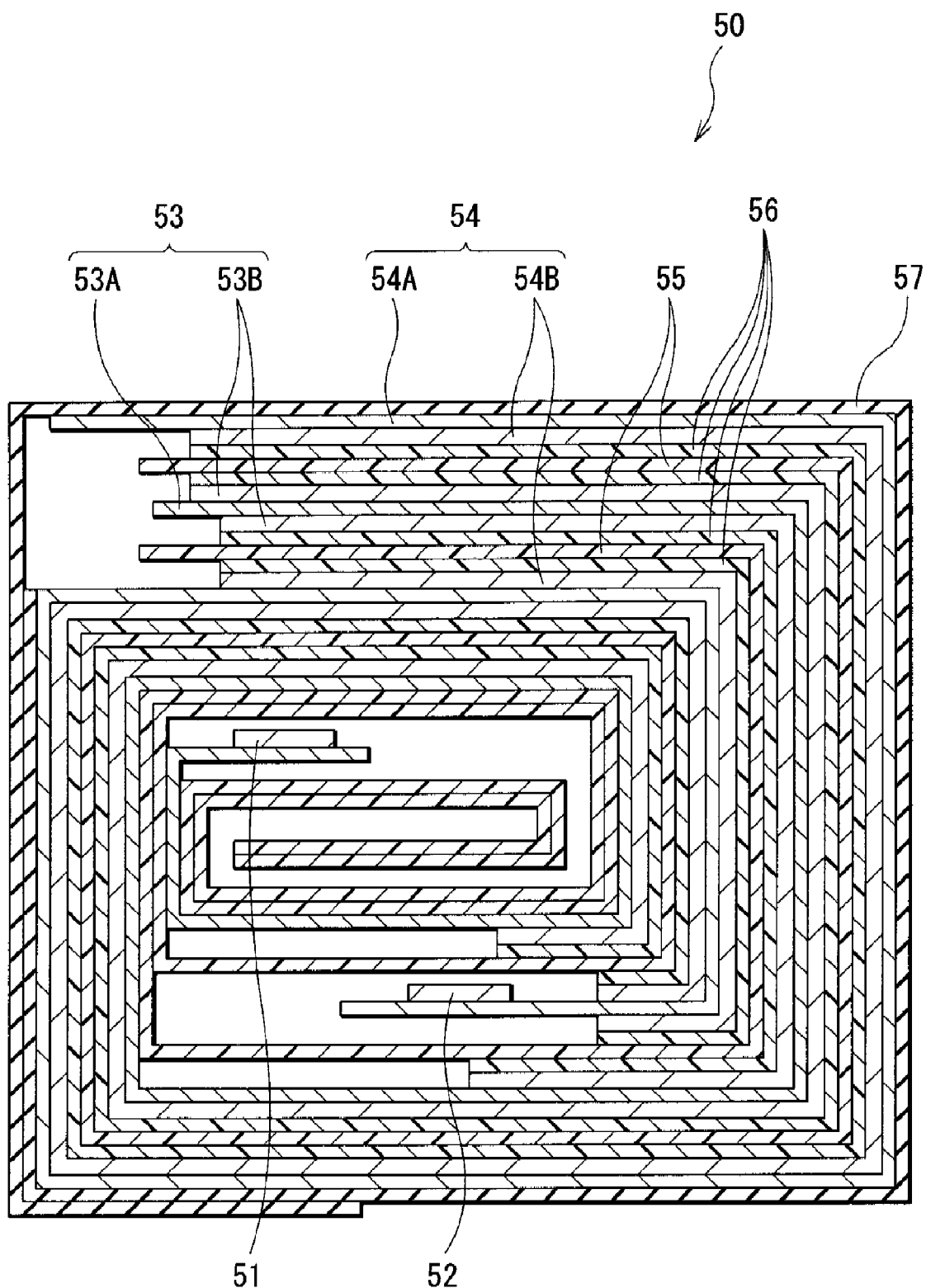
FIG. 9 is a sectional view of a spirally wound electrode body taken along a line IX-IX of FIG. 8.

FIG. 8 shows an exploded perspective view of a third battery, and FIG. 9 shows an enlarged sectional view taken along a line IX-IX of FIG. 8. In the battery, a spirally wound electrode body 50 to which a cathode lead 51 and an anode lead 52 are attached is contained in film-shaped package members 60, and the configuration of the battery including the package members 60 is a so-called laminate film type.

The cathode lead 51 and the anode lead 52 are drawn, for example, from the interiors of the package members 60 to outside in the same direction. The cathode lead 51 is made of, for example, a metal material such as aluminum, and the anode lead 52 are made of, for example, a metal material such as copper, nickel or stainless. The metal materials of which the cathode lead 51 and the anode lead 52 are made each have a sheet shape or a mesh shape.

The package members 60 are made of, for example, an aluminum laminate film including a nylon film, aluminum foil and a polyethylene film which are bonded in this order. The package members 60 are arranged so that the polyethylene film of each of the package members 60 faces the spirally wound electrode body 50, and edge portions of two rectangular aluminum laminate films are adhered to each other by fusion bonding or an adhesive.

An adhesive film 61 is inserted between the package members 60 and the cathode lead 51 and the anode lead 52 for preventing the entry of outside air. The adhesive film 61 is made of, for example, a material having adhesion to the cathode lead 51 and the anode lead 52, for example, a polyolefin resin such as polyethylene, polypropylene, modified polyethylene or modified polypropylene.

In addition, the package members 60 may be made of a laminate film with any other configuration, a polymer film such as polypropylene or a metal film instead of the above-described aluminum laminate film.

The spirally wound electrode body 50 is formed by laminating a cathode 53 and an anode 54 with a separator 55 and an electrolyte 56 in between, and then spirally winding them, and an outermost portion of the spirally wound electrode body 50 is protected with a protective tape 57.

The cathode 53 is formed by arranging a cathode active material layer 53B on both sides of a cathode current collector 53A having a pair of facing surfaces. The anode 54 has the same configuration as that of the above-described anode, and the anode 54 is formed by arranging an anode active material layer 54B on both sides of a strip-shaped anode current collector 54A. The configurations of the cathode current collector 53A, the cathode active material layer 53B, the anode current collector 54A, the anode active material layer 54B and the separator 55 are the same as those of the cathode current collector 21A, the cathode active material layer 21B, the anode current collector 22A, the anode active material layer 22B and the separator 23 in the first battery.

The electrolyte 56 includes an electrolytic solution and a polymer compound holding the electrolytic solution, and is a so-called gel electrolyte. The gel electrolyte is preferable, because the gel electrolyte is capable of obtaining high ionic conductivity (for example, 1 mS/cm or over at room temperature), and leakage of an electrolyte from the battery is prevented. The electrolyte 56 is arranged, for example, between the cathode 53 and the separator 55 and between the anode 54 and the separator 55.

Examples of the polymer compound include polyacrylonitrile, polyvinylidene fluoride, a copolymer of polyvinylidene fluoride and polyhexafluoropyrene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acids, polymethacrylic acids, styrene-butadiene rubber, nitrile-butadiene rubber, polystyrene, polycarbonate and the like. Only one kind or a mixture of a plurality of kinds selected from them may be used. Among them, as the polymer compound, polyacrylonitrile, polyvinylidene fluoride, polyhexafluoropropylene or polyethylene oxide is preferable, because they are electrochemically stable.

The composition of the electrolytic solution is the same as the composition of the electrolytic solution in the first battery. However, the solvent in this case means a wide concept including not only a liquid solvent but also a solvent having ionic conductivity capable of dissociating the electrolyte salt. Therefore, in the case where a polymer compound having ionic conductivity is used, the polymer compound is included in the concept of the solvent.

In addition, instead of the gel electrolyte 56 in which the polymer compound holds the electrolytic solution, the electrolytic solution may be used as it is. In this case, the separator 55 is impregnated with the electrolytic solution.

The secondary battery including the gel electrolyte 56 is manufactured by the following steps, for example.

At first, the cathode 53 in which the cathode active material layer 53B is arranged on both sides of the cathode current collector 53A and the anode 54 in which the anode active material layer 54B is arranged on both sides of the anode current collector 54A are formed by the same steps as the above-described steps of forming the cathode 21 and the anode 22 in the first battery. Next, the gel electrolyte 56 is formed by preparing a precursor solution including the electrolytic solution, the polymer compound and a solvent, applying the precursor solution to the cathode 53 and the anode 54, and volatilizing the solvent. Next, the cathode lead 51 and the anode lead 52 are attached to the cathode current collector 53A and the anode current collector 54A, respectively. Next, after the cathode 53 on which the electrolyte 56 is formed and the anode 54 on which the electrolyte 56 is formed are laminated with the separator 55 in between to form a laminate, the laminate is spirally wound in a longitudinal direction, and the protective tape 57 is bonded to an outermost portion of the laminate so as to form the spirally wound electrode body 50. Then, for example, the spirally wound electrode body 50 is sandwiched between the package members 60, and edge portions of the package members 60 are adhered to each other by thermal fusion bonding or the like to seal the spirally wound electrode body 50 in the package members 60. At this time, the adhesive film 61 is inserted between the cathode lead 51 and the anode lead 52, and the package members 60. Thereby, the secondary battery shown in FIGS. 8 and 9 is completed.

The above-described secondary battery may be manufactured by the following steps. At first, after the cathode lead 51 and the anode lead 52 are attached to the cathode 53 and the anode 54, respectively, the cathode 53 and the anode 54 are laminated with the separator 55 in between to form a laminate, and the laminate is spirally wound, and the protective tape 57 is bonded to an outermost portion of the spirally wound laminate so as to form a spirally wound body as a precursor body of the spirally wound electrode body 50. Next, the spirally wound body is sandwiched between the package members 60, and the edge portions of the package members 60 except for edge portions on one side are adhered by thermal fusion bonding or the like to form a pouched package, thereby the spirally wound body is contained in the package members 60. An electrolytic composition which includes the electrolytic solution, monomers as materials of a polymer compound and a polymerization initiator and, if necessary, any other material such as a polymerization inhibitor is prepared, and the electrolytic composition is injected into the package members 60, and then an opened portion of the package members 60 are sealed by thermal fusion bonding or the like. Finally, the monomers are polymerized by applying heat to form the polymer compound, thereby the gel electrolyte 56 is formed. Thus, the secondary battery shown in FIGS. 8 and 9 is completed.

In the laminate film type secondary battery, the anode 54 has the same configuration as that of the above-described anode, so the cycle characteristics and the manufacturing yield may be improved. The effects of the secondary battery except for the above-described effects are the same as those of the first battery.

EXAMPLES

Examples of the invention will be described in detail below.

Example 1-1

A laminate film type secondary battery shown in FIGS. 8 and 9 was manufactured by the following steps. At that time, the laminate film type secondary battery was a lithium-ion secondary battery in which the capacity of the anode 54 is represented based on insertion and extraction of lithium.

At first, the cathode 53 was formed. After lithium carbonate ($Li_2CO_3$) and cobalt carbonate ($CoCO_3$) were mixed at a molar ratio of 0.5:1, the mixture was fired in air at 900° C. for 5 hours to obtain a lithium-cobalt complex oxide ($LiCoO_2$). Next, after 91 parts by weight of the lithium-cobalt complex oxide as a cathode active material, 6 parts by weight of graphite as an electrical conductor and 3 parts by weight of polyvinylidene fluoride as a binder were mixed to form a cathode mixture, the cathode mixture was dispersed in N-methyl-2-pyrrolidone to form paste-form cathode mixture slurry. Finally, after the cathode mixture slurry was uniformly applied to both sides of the cathode current collector 53A made of strip-shaped aluminum foil (with a thickness of 12 μm), and was dried, the cathode mixture slurry was compression molded by a roller press to form the cathode active material layer 53B.

Next, the anode 54 was formed. At first, after the anode current collector 54A made of electrolytic copper foil (with a thickness of 18 μm and a ten-point height of roughness profile Rz of 3.5 μm) was prepared, silicon was deposited on both sides of the anode current collector 54A by an electron beam evaporation method using a deflection electron beam evaporation source while continuously introducing an oxygen gas and, if necessary, water vapor into a chamber, thereby an anode active material in the form of a plurality of particles was formed so as to have a single-layer configuration (with a thickness of 6.5 μm), so the anode active material layer 54B was formed. At that time, as the evaporation source, silicon with a purity of 99% was used, and the deposition rate was 10 nm/s, and the oxygen content in the anode active material was 3 at %. Moreover, a carbon dioxide ($CO_2$) gas and an argon (Ar) gas were introduced into the chamber, and the amounts of the gases introduced were changed within a range from $8.335 \times 10^{-8}$ $m^3$/s (=5 sccm) to $833.5 \times 10^{-8}$ $m^3$/s (500 sccm) both inclusive, thereby the diameter (hereinafter referred to as "peak diameter") at which the rate of change in the amount of mercury intruded had a peak (the peak P1 shown in FIG. 3) was 80 nm. After the rate of change in the amount of mercury intruded in the anode 54 cut into a size of 25 mm×350 mm was measured by a mercury porosimeter of Micromeritics (AutoPore 9500 series), the peak diameter was determined from the measurement result.

Next, the cathode lead 51 made of aluminum was attached to an end of the cathode current collector 53A by welding, and the anode lead 52 made of nickel was attached to an end of the anode current collector 54A by welding. Then, after the cathode 53, a three-layer configuration polymer separator 55 (with a thickness of 23 μm) formed by sandwiching a film made of porous polyethylene as a main component between films made of porous polypropylene as a main component, the anode 54, and the above-described polymer separator 55 were laminated in this order to form a laminate, and the laminate was spirally wound in a longitudinal direction, an outermost portion of the laminate was fixed by the protective tape 57 made of an adhesive tape to form a spirally wound body as a precursor body of the spirally wound electrode body 50. Next, after the spirally wound body was sandwiched between package members 60 made of a laminate film (with a total thickness of 100 μm) with a three-layer configuration formed by laminating nylon (with a thickness of 30 μm), aluminum (with a thickness of 40 μm) and cast polypropylene (with a thickness of 30 μm) in order from outside, the edge portions of the package members 60 except for edge portions on one side were adhered by thermal fusion bonding to form a pouched package, thereby the spirally wound body was contained in the package members 60. Next, the electrolytic solution was injected into the package members 60 from an opened portion of the package members 60, and the separator 55 was impregnated with the electrolytic solution, thereby the spirally wound electrode body 50 was formed.

To form the electrolytic solution, a mixture solvent formed by mixing ethylene carbonate (EC) and diethyl carbonate (DEC) was used as the solvent, and lithium hexafluorophosphate ($LiPF_6$) was used as the electrolyte salt. At that time, the composition of the mixture solvent (EC:DEC) had a weight ratio of 50:50, and the concentration of the electrolyte salt was 1 mol/kg.

Finally, the opened portion of the package members 60 were sealed by thermal fusion bonding in a vacuum atmosphere, thereby a laminate film type secondary battery was completed.

Examples 1-2 to 1-12

Secondary batteries were formed by the same steps as those in Example 1-1, except that instead of 80 nm, the peak diameter was 100 nm (Example 1-2), 120 nm (Example 1-3), 150 nm (Example 1-4), 200 nm (Example 1-6), 300 nm (Example 1-6), 400 nm (Example 1-7), 500 nm (Example 1-8), 600 nm (Example 1-9), 800 nm (Example 1-10), 1000 nm (Example 1-11) or 1200 nm (Example 1-12).

Comparative Examples 1-1 to 1-6

Secondary batteries were formed by the same steps as those in Example 1-1, except that the peak diameter was 40 nm (Comparative Example 1-1), 50 nm (Comparative Example 1-2), 60 nm (Comparative Example 1-3), 70 nm (Comparative Example 1-4), 1500 nm (Comparative Example 1-6) or 2000 nm (Comparative Example 1-6).

Figure 10:
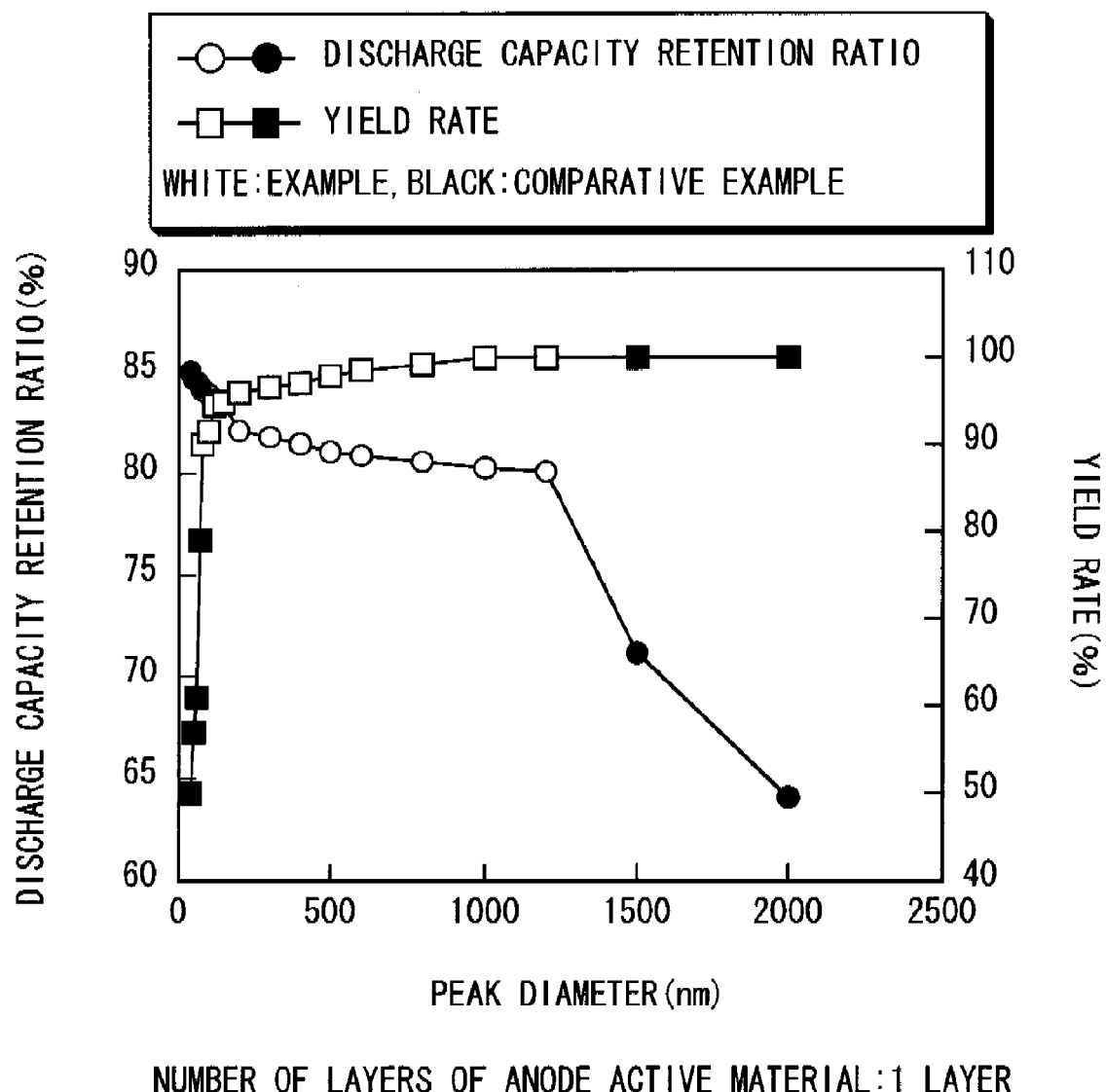
FIG. 10 is a diagram showing a correlation between a peak diameter and a discharge capacity retention ratio (the number of layers of an anode active material: one layer)

When the cycle characteristics and the manufacturing yields of the secondary batteries of Examples 1-1 to 1-12 and Comparative Examples 1-1 to 1-6 were determined, results shown in Table 1 and FIG. 10 were obtained.

To determine the cycle characteristics, a cycle test was performed by the following steps to determine the discharge capacity retention ratios of the secondary batteries. At first, to stabilize the battery state of the secondary battery, after one cycle of charge and discharge was performed on the secondary battery in an atmosphere of 23° C., the secondary battery was charged and discharged again to determine the discharge capacity in the second cycle. Next, 99 cycles of charge and discharge were performed on the secondary battery in the same atmosphere to determine the discharge capacity in the 101st cycle. Finally, the discharge capacity retention ratio (%)=(discharge capacity in the 101st cycle/discharge capacity in the second cycle)×100 was determined by calculation. As the condition of charge, after the secondary battery was charged at a constant current density of 3 mA/cm² until the battery voltage reached 4.2 V, the secondary battery was charged at a constant voltage of 4.2 V until the current density reached 0.3 mA/cm². Moreover, as the condition of discharge, the secondary battery was discharged at a constant current density of 3 mA/cm² until the battery voltage reached 2.5 V.

To determine the manufacturing yield, after the above-described cycle test was performed on 200 samples as the measurement number n of each secondary battery, the number of samples in which a short circuit did not occur during the test was counted to determine a yield rate (%)=(the number of samples in which a short circuit did not occur/200)×100 by calculation.

In addition, the same steps and the same conditions as the above-described steps and the above-described conditions were used to determine the cycle characteristics and the manufacturing yield of secondary batteries of the following examples and the following comparative examples.

TABLE 1

Anode active material: silicon (electron beam evaporation)
Ten-point mean roughness Rz = 3.5 μm
Oxygen content in anode active material = 3 at %

| | ANODE ACTIVE MATERIAL LAYER NUMBER (LAYER) | PEAK DIAMETER (nm) | DISCHARGE CAPACITY RETENTION RATIO (%) | YIELD RATE (%) |
|---|---|---|---|---|
| EXAMPLE 1-1 | 1 | 80 | 84.1 | 90 |
| EXAMPLE 1-2 | | 100 | 83.9 | 91.5 |
| EXAMPLE 1-3 | | 120 | 83.6 | 94.5 |
| EXAMPLE 1-4 | | 150 | 83.4 | 94.8 |
| EXAMPLE 1-5 | | 200 | 82.1 | 96 |
| EXAMPLE 1-6 | | 300 | 81.8 | 96.6 |
| EXAMPLE 1-7 | | 400 | 81.5 | 97 |
| EXAMPLE 1-8 | | 500 | 81.1 | 97.9 |
| EXAMPLE 1-9 | | 600 | 80.9 | 98.5 |
| EXAMPLE 1-10 | | 800 | 80.6 | 99.2 |
| EXAMPLE 1-11 | | 1000 | 80.3 | 100 |
| EXAMPLE 1-12 | | 1200 | 80.1 | 100 |
| COMPARATIVE EXAMPLE 1-1 | 1 | 40 | 85 | 50 |
| COMPARATIVE EXAMPLE 1-2 | | 50 | 84.6 | 57 |
| COMPARATIVE EXAMPLE 1-3 | | 60 | 84.5 | 61 |
| COMPARATIVE EXAMPLE 1-4 | | 70 | 84.3 | 79 |
| COMPARATIVE EXAMPLE 1-5 | | 1500 | 71.2 | 100 |
| COMPARATIVE EXAMPLE 1-6 | | 2000 | 64.1 | 100 |

As shown in Table 1 and FIG. 10, in the case where the diameter at which the rate of change in the amount of mercury intruded had the peak was changed, as the diameter increased, the discharge capacity retention ratio was gradually reduced, but the yield rate was gradually increased. The result indicated that when the peak diameter increased, the surface area of the anode active material was increased, so when charge and discharge were repeated, the discharge capacity easily declined, and the space for the anode active material during swelling was increased, so even if charge and discharge were repeated, a shirt circuit was less likely to occur. In this case, in Examples 1-1 to 1-12 in which the peak diameter was 80 nm to 1200 nm both inclusive, a higher discharge capacity retention ratio and a higher yield rate than those in Comparative Examples 1-1 to 1-6 in which the peak diameter was out of the range were obtained.

More specifically, in all of Examples 1-1 to 1-12, the discharge capacity retention ratio was 80% or over, and the yield rate was 90% or over. In particular, when the peak diameter was within a range from 100 nm to 1000 nm both inclusive, while keeping the discharge capacity retention ratio at 80% or over, the yield rate was higher, and when the peak diameter was within a range from 120 nm to 600 nm both inclusive, the yield rate was even higher. On the other hand, in Comparative Examples 1-1 to 1-4, the discharge capacity retention ratio reached 80%, but the yield rate was lower than 90%, and in Comparative Examples 1-5 and 1-6, the yield rate reached 90%, but the discharge capacity retention ratio was lower than 80%. Therefore, it was confirmed that in the secondary battery according to the embodiment of the invention, when the rate of change in the amount of mercury intruded into a plurality of pores which was measured by mercury porosimetry was distributed so as to have the peak in a diameter range from 80 nm to 1200 nm both inclusive, the cycle characteristics and the yield rate were improved, and when the rate of change had the peak in a diameter range from 100 nm to 1000 nm both inclusive, more specifically in a diameter range from 120 nm to 600 nm both inclusive, a higher effect was obtained.

Examples 2-1 to 2-12

Secondary batteries were formed by the same steps as those in Examples 1-1 to 1-12, except that the anode active material had a six-layer configuration. In the case where the anode active material was formed, while the anode current collector 54A was moved back and forth relatively to an evaporation source at a deposition rate of 100 nm/s, silicon was deposited successively to be laminated.

Comparative Examples 2-1 to 2-6

Secondary batteries were formed by the same steps as those in Comparative Examples 1-1 to 1-6, except that as in the case of Examples 2-1 to 2-12, the anode active material had a six-layer configuration.

Figure 11:
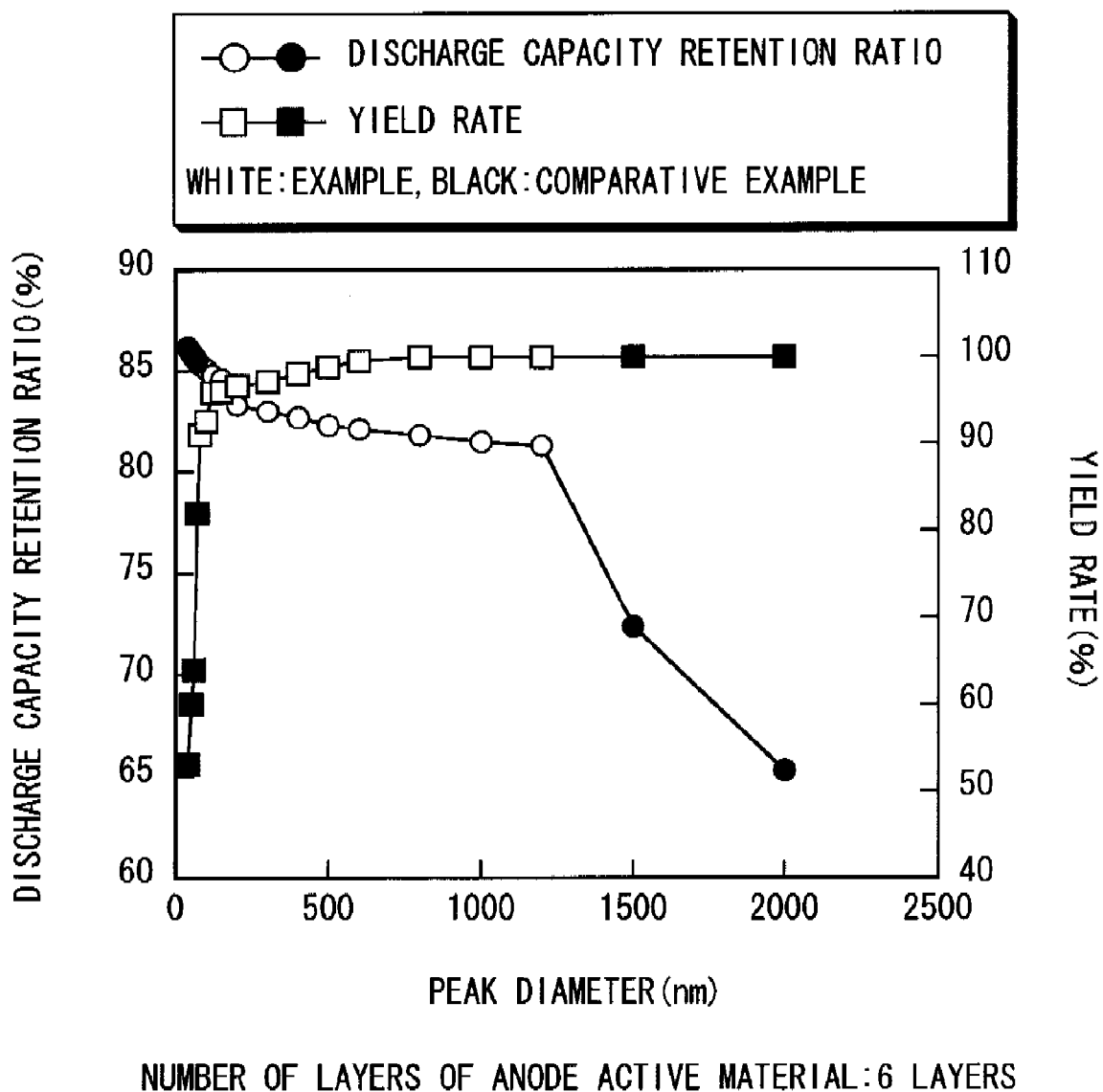
FIG. 11 is a diagram showing a correlation between a peak diameter and a discharge capacity retention ratio (the number of layers of an anode active material: 6 layers)

When the cycle characteristics and the manufacturing yields of the secondary batteries of Examples 2-1 to 2-12 and Comparative Examples 2-1 to 2-6 were determined, results shown in Table 2 and FIG. 11 were obtained.

As shown in Table 2 and FIG. 11, even in Examples 2-1 to 2-12 in which the anode active material had a six-layer configuration, the same results as those in Examples 1-1 to 1-12 in which the anode active material had a single-layer configuration were obtained. More specifically, in Examples 2-1 to 2-12 in which the peak diameter was within a range from 80 nm to 1200 nm both inclusive, in contrast to Comparative Examples 2-1 to 2-6 in which the peak diameter was out of the range, a discharge capacity retention ratio of 80% or over and a yield rate of 90% or over were obtained. Therefore, it was confirmed that in the secondary battery according to the embodiment of the invention, even in the case where the number of layers of the anode active material was changed, the cycle characteristics and the manufacturing yield were improved.

Figure 12:
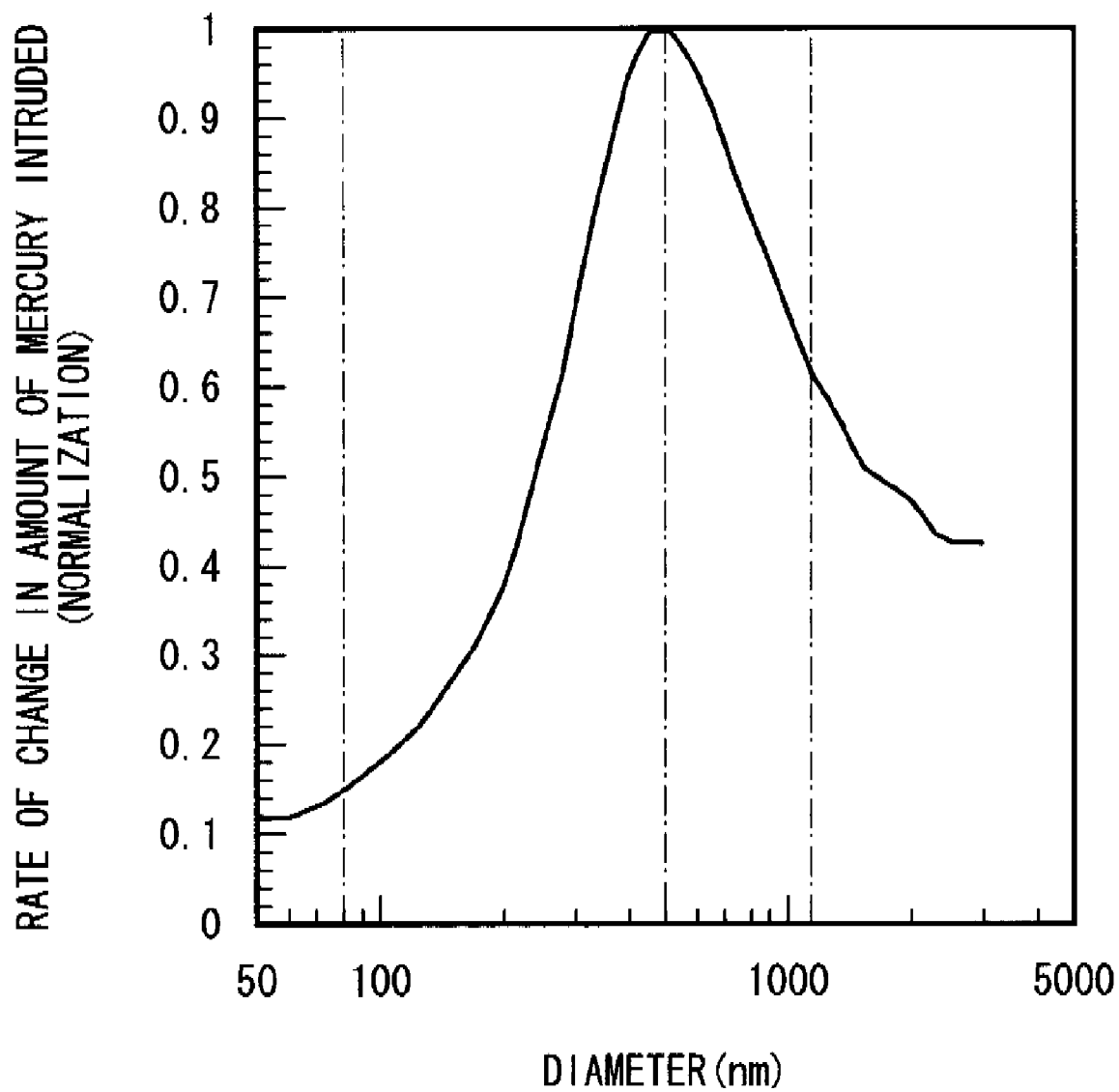
FIG. 12 is a chart showing the distribution of the rate of change in the amount of mercury intruded (in Example 2-8)

The distribution of the rate of change in the measured amount of mercury intruded of the secondary battery of Example 2-8 as a representative example of the above-described examples and comparative examples are as shown in FIG. 12. As shown in FIG. 12, the rate of change in the amount of mercury intruded was distributed so as to have a peak in a diameter range from 80 nm to 1200 nm both inclusive, and the diameter at the peak was 500 nm.

Examples 3-1 to 3-6

Secondary batteries were formed by the same steps as those in Example 2-7, except that instead of 3 at %, the oxygen content in the anode active material was 2 at % (Example 3-1), 10 at % (Example 3-2), 20 at % (Example 3-3), 30 at % (Example 3-4), 40 at % (Example 3-5) or 45 at % (Example 3-6).

Figure 13:
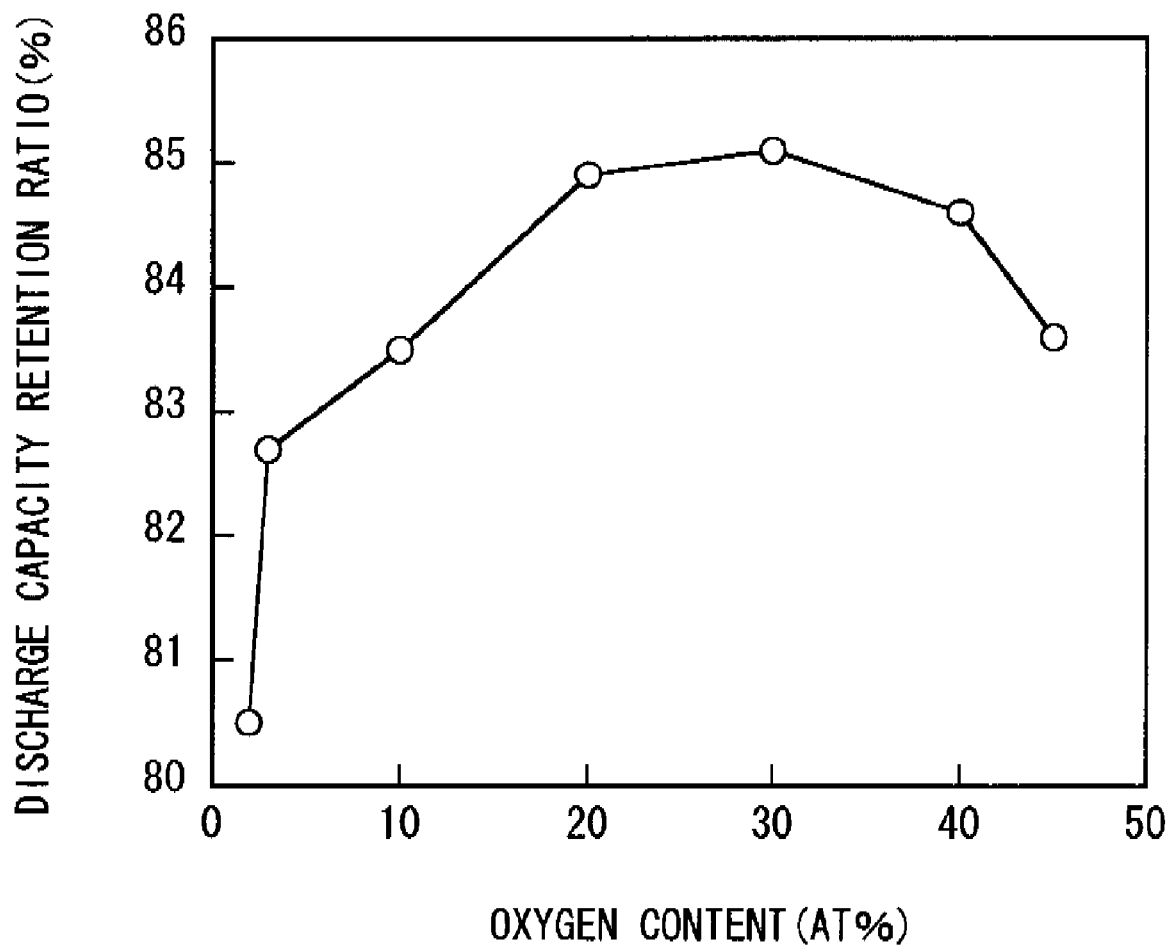
FIG. 13 is a diagram showing a correlation between the oxygen content and a discharge capacity retention ratio.

When the cycle characteristics and the manufacturing yields of the secondary batteries of Examples 3-1 to 3-6 were determined, results shown in Table 3 and FIG. 13 were obtained. In FIG. 3, the result of Example 2-7 is also shown.

TABLE 2

Anode active material: silicon (electron beam evaporation)
Ten-point height of roughness profile Rz = 3.5 μm
Oxygen content in anode active material = 3 at %

| | ANODE ACTIVE MATERIAL LAYER NUMBER (LAYER) | PEAK DIAMETER (nm) | DISCHARGE CAPACITY RETENTION RATIO (%) | YIELD RATE (%) |
|---|---|---|---|---|
| EXAMPLE 2-1 | 6 | 80 | 85.3 | 91 |
| EXAMPLE 2-2 | | 100 | 85.1 | 92.5 |
| EXAMPLE 2-3 | | 120 | 84.8 | 95.8 |
| EXAMPLE 2-4 | | 150 | 84.6 | 96 |
| EXAMPLE 2-5 | | 200 | 83.3 | 96.6 |
| EXAMPLE 2-6 | | 300 | 83 | 97.1 |
| EXAMPLE 2-7 | | 400 | 82.7 | 98 |
| EXAMPLE 2-8 | | 500 | 82.3 | 98.8 |
| EXAMPLE 2-9 | | 600 | 82.1 | 99.5 |
| EXAMPLE 2-10 | | 800 | 81.8 | 100 |
| EXAMPLE 2-11 | | 1000 | 81.5 | 100 |
| EXAMPLE 2-12 | | 1200 | 81.3 | 100 |
| COMPARATIVE EXAMPLE 2-1 | 6 | 40 | 86.2 | 53 |
| COMPARATIVE EXAMPLE 2-2 | | 50 | 85.9 | 60 |
| COMPARATIVE EXAMPLE 2-3 | | 60 | 85.7 | 64 |
| COMPARATIVE EXAMPLE 2-4 | | 70 | 85.5 | 82 |
| COMPARATIVE EXAMPLE 2-5 | | 1500 | 72.4 | 100 |
| COMPARATIVE EXAMPLE 2-6 | | 2000 | 65.3 | 100 |

TABLE 3

Anode active material: silicon (electron beam evaporation)
Ten-point height of roughness profile Rz = 3.5 μm

| | ANODE ACTIVE MATERIAL | | | DISCHARGE | |
|---|---|---|---|---|---|
| | LAYER NUMBER (LAYER) | OXYGEN CONTENT (at %) | PEAK DIAMETER (nm) | CAPACITY RETENTION RATIO (%) | YIELD RATE (%) |
| EXAMPLE 3-1 | 6 | 2 | 400 | 80.5 | 98 |
| EXAMPLE 2-7 | | 3 | | 82.7 | 98 |
| EXAMPLE 3-2 | | 10 | | 83.5 | 98 |
| EXAMPLE 3-3 | | 20 | | 84.9 | 98 |
| EXAMPLE 3-4 | | 30 | | 85.1 | 98 |
| EXAMPLE 3-5 | | 40 | | 84.6 | 98 |
| EXAMPLE 3-6 | | 45 | | 83.6 | 98 |

As shown in Table 3, in Examples 3-1 to 3-6 in which the oxygen content in the anode active material was different, as in the case of Example 2-7, a discharge capacity retention ratio of 80% or over and a yield rate of 90% or over were obtained. In this case, as shown in Table 3 and FIG. 13, there was a tendency that as the oxygen content increased, the discharge capacity retention ratio was increased, and then decreased, and when the content was smaller than 3 at %, the discharge capacity retention ratio was largely reduced. However, when the content was larger than 40 at %, a sufficient discharge capacity retention ratio was obtained, but the battery capacity declined. Therefore, it was confirmed that in the secondary battery according to the embodiment of the invention, even in the case where the oxygen content in the anode active material was changed, the cycle characteristics were improved, and when the content was within a range from 3 at % to 40 at % both inclusive, a higher effect was obtained.

Examples 4-1 to 4-3

Secondary batteries were formed by the same steps as those in Example 2-7, except that instead of the case where silicon was deposited while continuously introducing an oxygen gas or the like into a chamber so that the anode active material included oxygen, silicon was deposited while intermittently introducing an oxygen gas or the like into a chamber, thereby the anode active material was formed so that a first oxygen-containing region and a second oxygen-containing region with a higher oxygen content than that in the first oxygen-containing region were alternately laminated. At that time, the oxygen content in the second oxygen-containing region was 3 at %, and the number of the second oxygen-containing regions was 2 (Example 4-1), 4 (Example 4-2) or 6 (Example 4-3).

When the cycle characteristics and the manufacturing yields of the secondary batteries of Examples 4-1 to 4-3 were determined, results shown in Table 4 were obtained. In Table 4, the result of Example 2-7 is also shown.

TABLE 4

Anode active material: silicon (electron beam evaporation)
Ten-point height of roughness profile Rz = 3.5 μm

| | ANODE ACTIVE MATERIAL | | | DISCHARGE | |
|---|---|---|---|---|---|
| | LAYER NUMBER (LAYER) | NUMBER OF SECOND OXYGEN-CONTAINING REGIONS | PEAK DIAMETER (nm) | CAPACITY RETENTION RATIO (%) | YIELD RATE (%) |
| EXAMPLE 2-7 | 6 | — | 400 | 82.7 | 98 |
| EXAMPLE 4-1 | | 2 | | 83.5 | 98 |
| EXAMPLE 4-2 | | 4 | | 84.6 | 98 |
| EXAMPLE 4-3 | | 6 | | 85.9 | 98 |

As shown in Table 4, in Examples 4-1 to 4-3 in which the anode active material included the first and second oxygen-containing regions, as in the case of Example 2-7, a discharge capacity retention ratio of 80% or over and a yield rate of 90% or over were obtained. In this case, there was a tendency that as the number of second oxygen-containing regions increased, the discharge capacity retention ratio was increased. Therefore, it was confirmed that in the secondary battery according to the embodiment of the invention, even in the case where the anode active material particles were formed so as to include the first and second oxygen-containing regions, the cycle characteristics were improved, and when the number of second oxygen-containing regions were increased, a higher effect was obtained.

Examples 5-1 to 5-6

Secondary batteries were formed by the same steps as those in Example 2-7, except that silicon with a purity of 99% and a metal element with a purity of 99.9% were used as evaporation sources to form the anode active material including both of silicon and the metal element. At that time, as the metal element, iron (Example 6-1), nickel (Example 5-2), molybdenum (Example 5-3), titanium (Example 5-4), chromium (Example 5-5) or cobalt (Example 5-6) was used. At that time, the amount of the metal element evaporated was adjusted so that the content of the metal element in the anode active material was 5 at %.

When the cycle characteristics and the manufacturing yields of the secondary batteries of Examples 5-1 to 5-6 were determined, results shown in Table 5 were obtained. In Table 5, the result of Example 2-7 is also shown.

TABLE 5

Anode active material: silicon (electron beam evaporation)
Ten-point height of roughness profile Rz = 3.5 μm
Oxygen content in anode active material = 3 at %
Content of metal element in anode active material = 5 at %

| | ANODE ACTIVE MATERIAL | | | DISCHARGE | |
|---|---|---|---|---|---|
| | LAYER NUMBER (LAYER) | METAL ELEMENT | PEAK DIAMETER (nm) | CAPACITY RETENTION RATIO (%) | YIELD RATE (%) |
| EXAMPLE 2-7 | 6 | — | 400 | 82.7 | 98 |
| EXAMPLE 5-1 | | Fe | | 86.2 | 98 |
| EXAMPLE 5-2 | | Ni | | 86.1 | 98 |
| EXAMPLE 5-3 | | Mo | | 85.9 | 98 |
| EXAMPLE 5-4 | | Ti | | 85.7 | 98 |
| EXAMPLE 5-5 | | Cr | | 85.8 | 98 |
| EXAMPLE 5-6 | | Co | | 86.3 | 98 |

As shown in Table 5, in Examples 5-1 to 5-6 in which the anode active material included silicon as well as the metal element, as in the case of Example 2-7, a discharge capacity retention ratio of 80% or over and a yield rate of 90% or over were obtained. In this case, there was a tendency that the discharge capacity retention ratio in Examples 5-1 to 5-6 was higher than that in Example 2-7. Therefore, it was confirmed that in the secondary battery according to the embodiment of the invention, even in the case where the anode active material included the metal element, the cycle characteristics were improved, and when the metal element was included, a higher effect was obtained.

Example 6-1

A secondary battery was formed by the same steps as those in Example 2-7, except that instead of the electron beam evaporation method, the anode active material was formed by an RF magnetron sputtering method. At that time, silicon with a purity of 99.99% was used as a target, and the deposition rate was 0.5 nm/s, and the total thickness of the anode active material was 6.2 μm.

Example 6-2

A secondary battery was formed by the same steps as those in Example 2-7, except that instead of the electron beam evaporation method, the anode active material was formed by a CVD method. At that time, silane and argon were used as a material and an excitation gas, respectively, and the deposition rate and the substrate temperature were 1.5 nm/s and 200° C., respectively, and the total thickness of the anode active material was 6.3 μm.

When the cycle characteristics and the manufacturing yields of the secondary batteries of Examples 6-1 and 6-2 were determined, results shown in Table 6 were obtained. In Table 6, the result of Example 2-7 is also shown.

TABLE 6

Anode active material: silicon
Ten-point height of roughness profile Rz = 3.5 μm
Oxygen content in anode active material = 3 at %

| | ANODE ACTIVE MATERIAL | | DISCHARGE | |
|---|---|---|---|---|
| | LAYER NUMBER (LAYER) | FORMING METHOD | PEAK DIAMETER (nm) | CAPACITY RETENTION RATIO (%) | YIELD RATE (%) |
| EXAMPLE 2-7 | 6 | ELECTRON BEAM EVAPORATION | 400 | 82.7 | 98 |
| EXAMPLE 6-1 | | SPUTTERING | | 81.2 | 98 |
| EXAMPLE 6-2 | | CVD | | 81.3 | 98 |

As shown in Table 6, in Examples 6-1 and 6-2 in which the method of forming the anode active material was different, as in the case of Example 2-7, a discharge capacity retention ratio of 80% or over and a yield rate of 90% or over were obtained. In this case, there was a tendency that in the case where the electron beam evaporation method was used as the method of forming the anode active material, the discharge capacity retention ratio was higher than that in the case where the sputtering method or the CVD method was used. Therefore, it was confirmed that in the secondary battery according to the embodiment of the invention, even in the case where the method of forming the anode active material was changed, the cycle characteristics were improved, and when the evaporation method was used, a higher effect was obtained.

Examples 7-1 to 7-7

Secondary batteries were formed by the same steps as those in Example 2-7, except that instead of 3.5 μm, the ten-point height of roughness profile Rz of the surface of the anode current collector 54A was 1 μm (Example 7-1), 1.5 μm (Example 7-2), 2.5 μm (Example 7-3), 4.5 μm (Example 7-4), 5.5 μm (Example 7-5), 6.5 μm (Example 7-6) or 7 μm (Example 7-7).

When the cycle characteristics and the manufacturing yields of the secondary batteries of Examples 7-1 to 7-7 were determined, results shown in Table 7 and FIG. 14 were obtained. In Table 7, the result of Example 2-7 is also shown.

TABLE 7

Anode active material: silicon (electron beam evaporation)
Oxygen content in anode active material = 3 at %

|  | ANODE ACTIVE MATERIAL LAYER NUMBER (LAYER) | ANODE CURRENT COLLECTOR TEN-POINT HEIGHT OF ROUGHNESS PROFILE Rz (µm) | PEAK DIAMETER (nm) | DISCHARGE CAPACITY RETENTION RATIO (%) | YIELD RATE (%) |
|---|---|---|---|---|---|
| EXAMPLE 7-1 | 6 | 1 | 400 | 80 | 98 |
| EXAMPLE 7-2 |  | 1.5 |  | 81.1 | 98 |
| EXAMPLE 7-3 |  | 2.5 |  | 81.2 | 98 |
| EXAMPLE 2-7 |  | 3.5 |  | 82.7 | 98 |
| EXAMPLE 7-4 |  | 4.5 |  | 83.1 | 98 |
| EXAMPLE 7-5 |  | 5.5 |  | 83 | 98 |
| EXAMPLE 7-6 |  | 6.5 |  | 82.5 | 98 |
| EXAMPLE 7-7 |  | 7 |  | 80 | 98 |

As shown in Table 7, in Examples 7-1 to 7-7 in which the ten-point height of roughness profile Rz was different, as in the case of Example 2-7, a discharge capacity retention ratio of 80% or over and a yield rate of 90% or over were obtained. In this case, as shown in Table 7 and FIG. 14, there was a tendency that as the ten-point height of roughness profile Rz increased, the discharge capacity retention ratio was increased and then decreased, and when the ten-point height of roughness profile Rz was smaller than 1.5 µm, or larger than 6.5 µm, the discharge capacity retention ratio was largely reduced. Therefore, it was confirmed that in the secondary battery according to the embodiment of the invention, even in the case where the ten-point height of roughness profile Rz of the surface of the anode current collector 54A was changed, the cycle characteristics were improved, and when the ten-point height of roughness profile Rz was within a range from 1.5 µm to 6.5 µm both inclusive, a higher effect was obtained.

Example 8-1

A secondary battery was formed by the same steps as those in Example 2-7, except that instead of EC, 4-fluoro-1,3-dioxolane-2-one (FEC) as a fluorinated carbonate (monofluoroethylene carbonate) was used as the solvent.

Example 8-2

A secondary battery was formed by the same steps as those in Example 2-7, except that as the solvent, 4,5-difluoro-1,3-dioxolane-2-one (DFEC) as a fluorinated carbonate (difluoroethylene carbonate) was added, and the composition (EC:DFEC:DEC) of a mixture solvent had a weight ratio of 25:5:70.

Examples 8-3, 8-4

Secondary batteries were formed by the same steps as those in Example 8-1, except that as the solvent, vinylene carbonate (VC: Example 8-3) or vinyl ethylene carbonate (VEC: Example 8-4) as a cyclic carbonate including an unsaturated bond was added to the electrolytic solution. At that time, the content of VC or VEC in the electrolytic solution was 10 wt %.

Example 8-5

A secondary battery was formed by the same steps as those in Example 8-1, except that as the solvent, 1,3-propane sultone (PRS) as a sultone was added to the electrolytic solution. At that time, the concentration of PRS in the electrolytic solution was 1 wt %.

Example 8-6

A secondary battery was formed by the same steps as those in Example 8-1, except that as an electrolyte salt, lithium tetrafluoroborate ($LiBF_4$) was added to the electrolytic solution. At that time, the concentration of $LiBF_4$ in the electrolytic solution was 0.1 mol/kg.

Examples 8-7, 8-8

Secondary batteries were formed by the same steps as those in Example 8-1, except that as a solvent, sulfobenzoic anhydride (SBAH Example 8-7) or sulfopropionic anhydride (SPAH: Example 8-8) as an acid anhydride was added to the electrolytic solution. At that time, the concentration of SBAH or SPAH in the electrolytic solution was 1 wt %.

When the cycle characteristics and the manufacturing yields of the secondary batteries of Examples 8-1 to 8-8 were determined, results shown in Table 8 were obtained. In Table 8, the result of Example 2-7 is also shown.

At that time, in addition to the cycle characteristics, the swelling characteristics of the secondary batteries of Examples 2-7 and 8-5 were also determined. To determine the swelling characteristics, the secondary batteries were charged by the following steps. At first, to stabilize the battery state of each of the secondary battery, one cycle of charge and discharge was performed in an atmosphere at 23° C., and the thickness of the secondary battery before the second cycle of charge was measured. Next, after the secondary battery was charged in the same atmosphere, the thickness of the secondary battery after the second cycle of charge was measured. Finally, the swelling rate (%)=[(thickness after charge−thickness before charge)/thickness before charge]×100 was determined by calculation. At that time, charge conditions were the same as those in the case where the cycle characteristics were determined.

TABLE 8

Anode active material: silicon (electron beam evaporation)
Ten-point height of roughness profile Rz = 3.5 μm
Oxygen content in anode active material = 3 at %

| | ANODE ANODE ACTIVE MATEIRAL LAYER NUMBER (LAYER) | PEAK DIAMTER (nm) | ELECTROLYTIC SOLUTION SOLVENT (wt %) | | | | | DISCHARGE CAPACITY RETENTION RATION (%) | YIELD RATE (%) | SWELLING RATE (%) |
|---|---|---|---|---|---|---|---|---|---|---|
| | | | EC | FEC | DFEC | DEC | OTHERS | | | |
| EXAMLPE 2-7 | 6 | 400 | 50 | — | — | 50 | — | 82.7 | 98 | 3.02 |
| EXAMPLE 8-1 | | | — | 50 | — | 50 | | 84.5 | 98 | — |
| EXAMPLE 8-2 | | | 25 | — | 5 | 70 | | 84.7 | 98 | — |
| EXAMPLE 8-3 | | | — | 50 | — | 50 | VC | 85.1 | 98 | — |
| EXAMPLE 8-4 | | | | | | | VEC | 85.2 | 98 | — |
| EXAMPLE 8-5 | | | | | | | PRS | 84.6 | 98 | 0.36 |
| EXAMPLE 8-6 | | | | | | | LiBF$_4$ | 84.5 | 98 | — |
| EXAMPLE 8-7 | | | | | | | SBAH | 85.6 | 98 | — |
| EXAMPLE 8-8 | | | | | | | SPAH | 85.6 | 98 | — |

As shown in Table 8, in Examples 8-1 to 8-8 in which the composition of the solvent and the kind of the electrolyte salt were different, as in the case of Example 2-7, a discharge capacity retention ratio of 80% or over and a yield rate of 90% or over were obtained. Therefore, it was confirmed that in the secondary battery according to the embodiment of the invention, even in the case where the composition of the solvent or the kind of the electrolyte salt was changed, the cycle characteristics were improved.

In particular, in Examples 8-1 and 8-2, the discharge capacity retention ratio was higher than that in Example 2-7. In this case, there was a tendency that in the case where the solvent included DFEC, the discharge capacity retention ratio was higher than that in the case the solvent included FEC. Therefore, it was confirmed that when the solvent included a fluorinated carbonate, the cycle characteristics were further improved, and when difluoroethylene carbonate was used as the fluorinated carbonate, a higher effect than that in the case where monofluoroethylene carbonate was used was obtained.

Moreover, in Examples 8-3 to 8-8, the discharge capacity retention ratio was higher than that in Example 2-7. In this case, there was a tendency that when the solvent included VC or VEC, the discharge capacity retention ratio was higher than that in the case where the solvent included PRS or LiBF$_4$, and in the case where SBAH or SPAH was included, the discharge capacity retention ratio was further increased. Therefore, it was confirmed that when the cyclic carbonate including an unsaturated bond, a sultone, the electrolyte salt including boron and fluorine, or an acid anhydride was included, the cycle characteristics were further improved, and when the cyclic carbonate including an unsaturated bond was included, and the acid anhydride was also used, a higher effect was obtained.

In Example 8-5 in which the solvent included PRS, the swelling rate was largely reduced, compared to Example 2-7 in which the solvent did not include PRS. Therefore, it was confirmed that in the secondary battery according to the embodiment of the invention, when the solvent included a sultone or the like, the swelling characteristics were improved.

Example 9-1

A secondary battery was formed by the same steps as those in Example 2-7, except that instead of the laminate film type secondary battery, a prismatic secondary battery shown in FIGS. 4 and 5 was formed by the following steps.

At first, after the cathode 21 and the anode 22 were formed, the cathode lead 24 made of aluminum and the anode lead 25 made of nickel were attached to the cathode current collector 21A and the anode current collector 22A by welding, respectively. Next, the cathode 21, the separator 23 and the anode 22 were laminated in this order, and were spirally wound in a longitudinal direction, and then molded into a flat shape, thereby the battery element 20 was formed. Then, after the battery element 20 was contained in the battery can 11 made of aluminum, the insulating plate 12 was arranged on the battery element 20. Next, after the cathode lead 24 and the anode lead 25 were welded to the cathode pin 15 and the battery can 11, respectively, the battery cover 13 was fixed in an open end of the battery can 11 by laser welding. Finally, the electrolytic solution was injected into the battery can 11 through the injected hole 19, and the injection hole 19 was filled with the sealing member 19A, thereby a prismatic battery was formed.

Example 9-2

A secondary battery was formed by the same steps as those in Example 9-1, except that instead of the battery can 11 made of aluminum, the battery can 11 made of iron was used.

When the cycle characteristics and the manufacturing yields of the secondary batteries of Examples 9-1 and 9-2 were determined, results shown in Table 9 were obtained. In Table 9, the result of Example 2-7 is also shown.

TABLE 9

Anode active material: silicon (electron beam evaporation)
Ten-point height of roughness profile Rz = 3.5 μm
Oxygen content in anode active material = 3 at %

| | BATTERY CONFIGURATION | ANODE ACTIVE MATERIAL LAYER NUMBER (LAYER) | PEAK DIAMETER (nm) | DISCHARGE CAPACITY RETENTION RATIO (%) | YIELD RATE (%) |
|---|---|---|---|---|---|
| EXAMPLE 2-7 | LAMINATE FILM | 6 | 400 | 82.7 | 98 |
| EXAMPLE 9-1 | PRISMATIC (ALUMINUM) | | | 85.3 | 98 |
| EXAMPLE 9-2 | PRISMATIC (IRON) | | | 87.2 | 98 |

As shown in Table 9, in Examples 9-1 and 9-2 in which the battery configuration was different, as in the case of Example 2-7, a discharge capacity retention ratio of 80% or over and a yield rate of 90% or over were obtained. In this case, the discharge capacity retention ratio was higher than that in Example 2-7, and there was a tendency that in the case where the battery can 11 was made of iron, the discharge capacity retention ratio was higher than that in the case where the battery can 11 was made of aluminum. Therefore, it was confirmed that in the secondary battery according to the embodiment of the invention, even in the case where the battery configuration was changed, the cycle characteristics were improved, and when the battery configuration had a prismatic type, the cycle characteristics were further improved, compared to the case where the battery configuration had a laminate film type, and in the case where the battery can 11 made of iron was used, a higher effect was obtained. Although descriptions are not given here referring to a specific example, in a prismatic secondary battery in which the package member was made of a metal material, the cycle characteristics and the swelling characteristics were improved, compared to the laminate film type secondary battery, so it was obvious that in a cylindrical secondary battery in which the package member is made of a metal material, the same result was obtained.

It was obvious from the results shown in Tables 1 to 9 and FIGS. 10 to 14 that in the case where the anode active material included a plurality of pores, when the rate of change in the amount of mercury intruded into the plurality of pores which was measured by mercury porosimetry had a peak in a diameter range from 80 nm to 1200 nm both inclusive, independent of the conditions such as the number of layers of the anode active material or the composition of the anode active material, the cycle characteristics and the manufacturing yield were improved.

Although the present invention is described referring to the embodiment and the examples, the invention is not limited to the embodiment and the examples, and may be variously modified. For example, in the above-described embodiment and the above-described materials, as the kind of the secondary battery, the lithium-ion secondary battery in which the capacity of the anode is represented based on the insertion and extraction of lithium is described; however, the invention is not limited to the lithium-ion secondary battery. The battery of the invention is applicable to a secondary battery in which the charge capacity of an anode material capable of inserting and extracting lithium is smaller than the charge capacity of a cathode, thereby the capacity of the anode includes a capacity by insertion and extraction of lithium and a capacity by precipitation and dissolution of lithium, and is represented by the sum of them in the same manner.

In the above-described embodiment and the above-described examples, the case where the battery has a prismatic type, a cylindrical type or a laminate film type, and the case where the battery element has a spirally wound configuration are described as examples; however, the secondary battery of the invention is applicable to the case where a secondary battery has any other shape such as a coin type or a button type or the case where the battery element has any other configuration such as a laminate configuration in the same manner.

In the above-described embodiment and the above-described examples, the case where lithium is used as an electrode reactant is described; however, any other Group 1A element such as sodium (Na) or potassium (K), a Group 2A element such as magnesium (Mg) or calcium (Ca), or any other light metal such as aluminum may be used. Also in this case, as the anode active material, the anode material described in the above-described embodiment may be used.

In the above-described embodiment and the above-described examples, an appropriate range, which is derived from the results of the examples, of a diameter at which the rate of change in the amount of mercury intruded has a peak in the anode or the battery of the invention is described; however, the description does not exclude the possibility that the diameter is out of the above-described range. More specifically, the above-described appropriate range is specifically a preferable range to obtain the effects of the invention, and as long as the effects of the invention are obtained, the diameter may be deviated from the above-described range to some extent. It is not limited to the above-described diameter, and the same holds for the oxygen content in the anode active material, the ten-point height of roughness profile Rz of the surface of the anode current collector, and the like.

It should be understood by those skilled in the art that various modifications, combinations, sub-combinations and alterations may occur depending on design requirements and other factors insofar as they are within the scope of the appended claims or the equivalents thereof.

What is claimed is:
1. An anode comprising:
an anode current collector; and
an anode active material layer arranged on the anode current collector,
wherein
the anode active material layer includes an anode active material including a plurality of pores,
the rate of change in the amount of mercury intruded into the plurality of pores is distributed so as to have a peak in a diameter range from 80 nm to 1200 nm both inclusive, the amount of mercury intruded being measured by mercury porosimetry, and the rate of change in the amount of mercury intruded has another peak in a diameter range from 3 nm to 50 nm both inclusive.

2. The anode according to claim 1, wherein the rate of change in the amount of mercury intruded has a peak in a diameter range from 100 nm to 1000 nm both inclusive.

3. The anode according to claim 1, wherein the rate of change in the amount of mercury intruded has a peak in a diameter range from 120 nm to 600 nm both inclusive.

4. The anode according to claim 1, wherein the anode active material includes silicon (Si).

5. The anode according to claim 4, wherein the anode active material includes oxygen (O), and the oxygen content in the anode active material is within a range from 3 at % to 40 at % both inclusive.

6. The anode according to claim 4, wherein the anode active material includes at least one kind of metal element selected from the group consisting of iron (Fe), cobalt (Co), nickel (Ni), chromium (Cr), titanium (Ti) and molybdenum (Mo).

7. The anode according to claim 1, wherein the anode active material is in the form of a plurality of particles.

8. The anode according to claim 7, wherein the anode active material has a multilayer configuration in its particles.

9. The anode according to claim 1, wherein the anode active material is formed by a vapor-phase method.

10. The anode according to claim 1, wherein the ten-point height of roughness profile Rz of the surface of the anode current collector is within a range from 1.5 μm to 6.5 μm both inclusive.

11. An anode comprising:
an anode current collector; and
an anode active material layer arranged on the anode current collector,
wherein
the anode active material layer includes an anode active material including a plurality of pores, and
the rate of change in the amount of mercury intruded into the plurality of pores is distributed so as to have a peak in a diameter range from 80 nm to 1200 nm both inclusive, the amount of mercury intruded being measured by mercury porosimetry, and
the anode active material includes an oxygen-containing region including oxygen in its thickness direction, and the oxygen content in the oxygen-containing region is higher than the oxygen content in a region other than the oxygen-containing region.

12. The anode according to claim 11, wherein the rate of change in the amount of mercury intruded has another peak in a diameter range from 3 nm to 50 nm both inclusive.

13. A battery comprising a cathode, an anode and an electrolytic solution, wherein:
the anode includes an anode current collector and an anode active material layer arranged on the anode current collector,
the anode active material layer includes an anode active material including a plurality of pores,
the rate of change in the amount of mercury intruded into the plurality of pores is distributed so as to have a peak in a diameter range from 80 nm to 1200 nm both inclusive, the amount of mercury intruded being measured by mercury porosimetry, and
the anode active material includes oxygen, and the oxygen content in the anode active material is within a range from 3 at % to 40 at % both inclusive.

14. The battery according to claim 13, wherein the rate of change in the amount of mercury intruded has a peak in a diameter range from 100 nm to 1000 nm both inclusive.

15. The battery according to claim 13, wherein the rate of change in the amount of mercury intruded has a peak in a diameter range from 120 nm to 600 nm both inclusive.

16. The battery according to claim 13, wherein the rate of change in the amount of mercury intruded has another peak in a diameter range from 3 nm to 50 nm both inclusive.

17. The battery according to claim 13, wherein the anode active material includes silicon.

18. The battery according to claim 17, wherein the anode active material includes at least one kind of metal element selected from the group consisting of iron, cobalt, nickel, chromium, titanium and molybdenum.

19. The battery according to claim 13, wherein the anode active material is in the form of a plurality of particles.

20. The battery according to claim 19, wherein the anode active material has a multilayer configuration in its particles.

21. The battery according to claim 13, wherein the anode active material is formed by a vapor-phase method.

22. The battery according to claim 13, wherein the ten-point height of roughness profile Rz of the surface of the anode current collector is within a range from 1.5 μm to 6.5 μm both inclusive.

23. The battery according to claim 13, wherein the electrolytic solution includes a solvent including a sultone.

24. The battery according to claim 23, wherein the sultone is 1,3-propene sultone.

25. The battery according to claim 13, wherein the electrolytic solution includes a solvent including a cyclic carbonate including an unsaturated bond.

26. The battery according to claim 25, wherein the cyclic carbonate including an unsaturated bond is vinylene carbonate or vinyl ethylene carbonate.

27. The battery according to claim 13, wherein the electrolytic solution includes a solvent including a fluorinated carbonate.

28. The battery according to claim 27, wherein the fluorinated carbonate is difluoroethylene carbonate.

29. The battery according to claim 13, wherein the electrolytic solution includes a solvent including an acid anhydride.

30. The battery according to claim 29, wherein the acid anhydride is sulfobenzoic anhydride or sulfopropionic anhydride.

31. The battery according to claim 13, wherein the electrolytic solution includes an electrode salt including boron (B) and fluorine (F).

32. The battery according to claim 31, wherein the electrolyte salt is lithium tetrafluoroborate ($LiBF_4$).

33. The battery according to claim 13, wherein the cathode, the anode and the electrolytic solution are contained in a cylindrical or prismatic package member.

34. The battery according to claim 33, wherein the package member includes iron or an iron alloy.

35. A battery comprising a cathode, an anode and an electrolytic solution, wherein:
the anode includes an anode current collector and an anode active material layer arranged on the anode current collector,
the anode active material layer includes an anode active material including a plurality of pores,
the rate of change in the amount of mercury intruded into the plurality of pores is distributed so as to have a peak in a diameter range from 80 nm to 1200 nm both inclusive, the amount of mercury intruded being measured by mercury porosimetry, and the anode active material includes an oxygen-containing region including oxygen in its thickness direction, and the oxygen content in the oxygen-containing region is higher than the oxygen content in a region other than the oxygen-containing region.

36. The battery according to claim 35, wherein the rate of change in the amount of mercury intruded has another peak in a diameter range from 3 nm to 50 nm both inclusive.

* * * * *